United States Patent [19]
Kendall et al.

[11] Patent Number: 5,995,918
[45] Date of Patent: Nov. 30, 1999

[54] SYSTEM AND METHOD FOR CREATING A LANGUAGE GRAMMAR USING A SPREADSHEET OR TABLE INTERFACE

[75] Inventors: Daythal Lee Kendall, Glenside; Dennis Lee Wadsworth, Downingtown; Ahmed Tewfik Bouzid; Deborah Anna Dahl, both of Norristown; Hua Hua, Penllyn, all of Pa.

[73] Assignee: Unisys Corporation, Blue Bell, Pa.

[21] Appl. No.: 08/932,937

[22] Filed: Sep. 17, 1997

[51] Int. Cl.$^6$ .................. G06F 17/20; G10L 5/06
[52] U.S. Cl. .................. 704/1; 704/9; 704/257; 704/275; 379/88.01; 707/503
[58] Field of Search .................. 704/1, 9, 235, 704/257, 270, 277, 275; 395/705, 708; 434/167, 169, 185; 707/503, 504, 509; 379/88.01, 88.02, 88.03, 88.04, 88.13, 88.18, 93.12

[56] References Cited

U.S. PATENT DOCUMENTS

| | | | |
|---|---|---|---|
| Re. 33,597 | 5/1991 | Levinson et al. | 704/256 |
| 4,156,868 | 5/1979 | Levinson | 704/251 |
| 4,914,704 | 4/1990 | Cole et al. | 704/235 |
| 5,357,596 | 10/1994 | Takebayashi et al. | 704/275 |
| 5,390,279 | 2/1995 | Strong | 704/200 |
| 5,457,768 | 10/1995 | Tsuboi et al. | 704/231 |
| 5,581,760 | 12/1996 | Atkinson et al. | 395/702 |
| 5,652,897 | 7/1997 | Linebarger et al. | 704/4 |
| 5,799,276 | 8/1998 | Komissarchik et al. | 704/251 |
| 5,850,629 | 12/1998 | Holm et al. | 704/260 |

FOREIGN PATENT DOCUMENTS 408030291A 2/1996 Japan.
WO 95/27976 10/1995 WIPO.

OTHER PUBLICATIONS

"Transition Network Grammar for Natural Language Analysis" by W.A. Woods, Communications of the ACM, vol. 13, No. 10, pp. 591–606, Oct. 1970.

"Case Study: the Chart Parser" by Harry Tennant, Natural Language Processing, Petrocelli Book, New York/Princeton, pp. 75–101, 1981.

*Primary Examiner*—Joseph Thomas
*Attorney, Agent, or Firm*—John B. Sowell; Mark T. Starr; Steven B. Samuels

[57] ABSTRACT

The present invention is a computer software system that allows the developer of a speech-enabled system to create a grammar and corpus for use in the system. A table interface is used, and phrases in the grammar are entered into cells in the table. The table also includes token data which corresponds to each valid utterance. When the grammar is defined, the computer software system automatically traverses the table to enumerate all possible valid utterances in the grammar. This traversal generates a listing (corpus) of valid utterances and their respective tokens. This listing can then be used to interpret spoken utterances for a speech-enabled system. The computer software system also transcribes the grammar rules found in the table to a format compatible with a variety of supported commercially-available speech recognizers.

17 Claims, 21 Drawing Sheets

| Fig. 2b | Fig. 2b |

| Fig. 4a | Fig. 4a |

| Name | Accepts | Returns |
|---|---|---|
| TIME1 | one o'clock p.m.; thirteen hundred hours | 1:00 PM (normal format) |
| TIME2 | one o'clock p.m.; thirteen hundred hours | 13:00 (European/military format) |
| INTEGER1 | one hundred twenty three | digits |
| INTEGER2 | one two three . . . (ten digits) | digits |
| CURRENCY1 | twenty three dollars and fifteen cents | 23.15 |
| CURRENCY2 | two three dollars and fifteen cents | 23.15 |
| DATE1 | march first nineteen ninety seven; the first of march | 03/01/1997 (American format) |
| DATE2 | march first nineteen ninety seven; the first of march | 01/03/1997 (European format) |

*Figure 5*

SAT-Annotated Corpus

ProjectTestProject     8/14/97 10:53:02 AM

| Compartment Name | Compartment Corpus File Name | Creation Date |
|---|---|---|
| ☑ COMPARTMEN... | C:\SAT 1.2.x\Projects\TestProject\Cor... | 8/14/97 10:53:00 AM |

Processing Results

The annotated Corpus has been saved in the following files:
C:\SAT 1.2.x\Projects\TestProject\SAT\TestProjectAnswers.txt
C:\SAT 1.2.x\Projects\TestProject\SAT\TestProjectCorpus.txt

[ Create ]     [ Close ]     [ Help ]

*Figure 7*

SYSTEM AND METHOD FOR CREATING A LANGUAGE GRAMMAR USING A SPREADSHEET OR TABLE INTERFACE

FIELD OF THE INVENTION

This invention relates generally to computerized natural language systems. More particularly, it relates to a computer system and method for creating a grammar and automatically generating a corpus of valid utterances in the grammar, as well as a file containing the set of rules that define the grammar. It also relates to including token information in such a corpus to represent the meaning of each utterance to a speech-enabled system using the grammar.

DESCRIPTION OF THE RELATED ART

Computers have become a mainstay in our everyday lives. Many of us spend hours a day using the machines at work, home and even while shopping. Using a computer, however, has always been on the machine's terms. A mouse, push-buttons and keyboards have always been somewhat of an unnatural way to tell the computers what we want. However, as computer technology continues to advance, the computer is edging towards communicating with humans on our terms: the spoken word.

There are essentially two steps in creating a computer that can speak with humans. First, the computer needs an automatic speech recognition system to detect the spoken words and convert them into some form of computer-readable data, such as simple text. Second, the computer needs some way to analyze the computer-readable data and determine what those words, as they were used, meant.

Traditional speech recognizers have become quite efficient at identifying spoken words, and several good speech recognizers are commercially available. The ASR-1500, manufactured by Lernout & Hauspie; Watson 2.0, manufactured by AT&T; and Nuance 5.0, by Nuance are just a few examples of effective continuous speech, speaker independent speech recognizers. A speech recognizer is "continuous" if it does not require the speaker to pause between words. A recognizer is "speaker independent" if it does not need to have heard the speaker's voice before in order to understand the speaker's words. For example, some speech recognizers must first learn the user's voice before it can understand the words. Learning the user's voice usually means having the recognizer record and memorize the user's voice as s/he recites a list of key phonetic words or sounds.

Recognizers, such as the ASR-1500 and Watson 2.0 listed above, typically require advance notice of the grammar they will be asked to listen for. This advance notice comes in the form of a vendor-specific ASR grammar file that describes the rules and contents of the grammar. However, there is no easy way to create this data file. The manufacturers of the speech recognizers listed above will provide the user with the format in which the data file must be written, but it is up to the user to actually write the data file.

There are several challenges to the user who must write this file: 1) the file format is usually what is best for the speech recognizer software, and as such is not very intuitive or easy to understand; 2) even simple grammars can result in large grammar files, increasing the possibility for error; 3) moderately large grammar files can have hundreds (or thousands) of rules, and logical errors in these rules are easy to make but hard to find, and 4) the large amount of time necessary to write the file and check for errors. What is needed is a simpler way for the user of a speech recognizer to define a grammar and generate a grammar file compatible with the speech recognizer.

Furthermore, in the related copending application noted above, a speech enabling system is disclosed which requires an annotated corpus for the grammar. The annotated corpus is essentially a listing of valid utterances (statements) in the grammar, as well as a token data value that represents the meaning for each valid utterance. Such a corpus could contain millions of entries, and what is needed is a simplified method for generating this annotated corpus.

The present invention satisfies both of these needs.

SUMMARY OF THE INVENTION

A general purpose of the present invention is to provide a toolkit for generating a context-free grammar.

Another object of the present invention is to provide a toolkit for simplifying the task of generating a context-free grammar and an annotated corpus of utterances in the grammar.

A further object of the present invention is to provide a system and method for creating a corpus supported by a grammar that includes token data representing the meaning of each item in the corpus.

These and other objects are accomplished by the present invention which provides interactive voice recognition system developers with a simple and intuitive way to generate grammar corpora, or the list of words and phrases (utterances) that make up a language. A table comprised of columns and rows of cells is initially used to define the grammar.

As a simplified description of the tables used in the preferred embodiment, a valid utterance begins with a cell in the leftmost column, ends in a column to the right, and must include the contents of one cell from each column in between. This left-to-right progression traces a path through the table, where the path itself is the valid utterance. Since it is possible for valid utterances with completely different meanings to begin with the same cell in the leftmost column, heavy lines within columns are used to form barriers which the path cannot cross when the next cell in the path is considered. Thus, the path of an utterance having one meaning cannot continue with a cell in the path of an utterance having a completely different meaning.

Eventually, the path of a valid utterance ends when the last word in the utterance is reached. In the preferred embodiment, the next non-blank cell in the same row as the last word of the utterance will contain token data. This token data will represent, to the speech-enabled application being developed, the meaning of the valid utterance.

Cells can also contain other types of data. Some cells may contain references to other tables. Other cells may contain variables, which are phrases (such as numbers, dates, times and dollar amounts) that return a separate data value to the speech-enabled application. Cells may contain directives, or commands, which are understood by the speech recognizer. Cells may be identified as optional, where utterances are valid with or without the contents of the optional cell.

When the developer is finished entering data in the table, the grammar has been defined. The table is then traversed to generate an enumerated list (corpus) of valid utterances in the grammar, where each utterance in the corpus also includes a token. The table is also processed a second time to generate a grammar file which will serve as input to the automatic speech recognition (ASR) system. During this second process, the grammar is also optimized to take advantage of performance peculiarities of the ASR speech recognizer. These processes need not occur in the order in which they are described.

The corpus and grammar file are then used, in the preferred embodiment, in the interactive voice recognition system (IVR), which is the system that is actually conversing with the speaker. Valid utterances heard by the speech recognizer are reported to the IVR, which then passes the valid utterances to the runtime interpreter (subject of copending application named above), which compares the valid utterances detected by the speech recognizer with the corpus of valid utterances in the grammar. When a match is found, the associated token is retrieved and returned to the IVR. The IVR will understand, once given the token, what the detected valid utterance meant and can react accordingly.

BRIEF DESCRIPTION OF THE DRAWINGS

FIG. 5 is a table showing the variable types supported in the preferred embodiment.

FIG. 7 shows the Annotated Corpus Dialog.

DESCRIPTION OF THE PREFERRED EMBODIMENT

Figure 1:
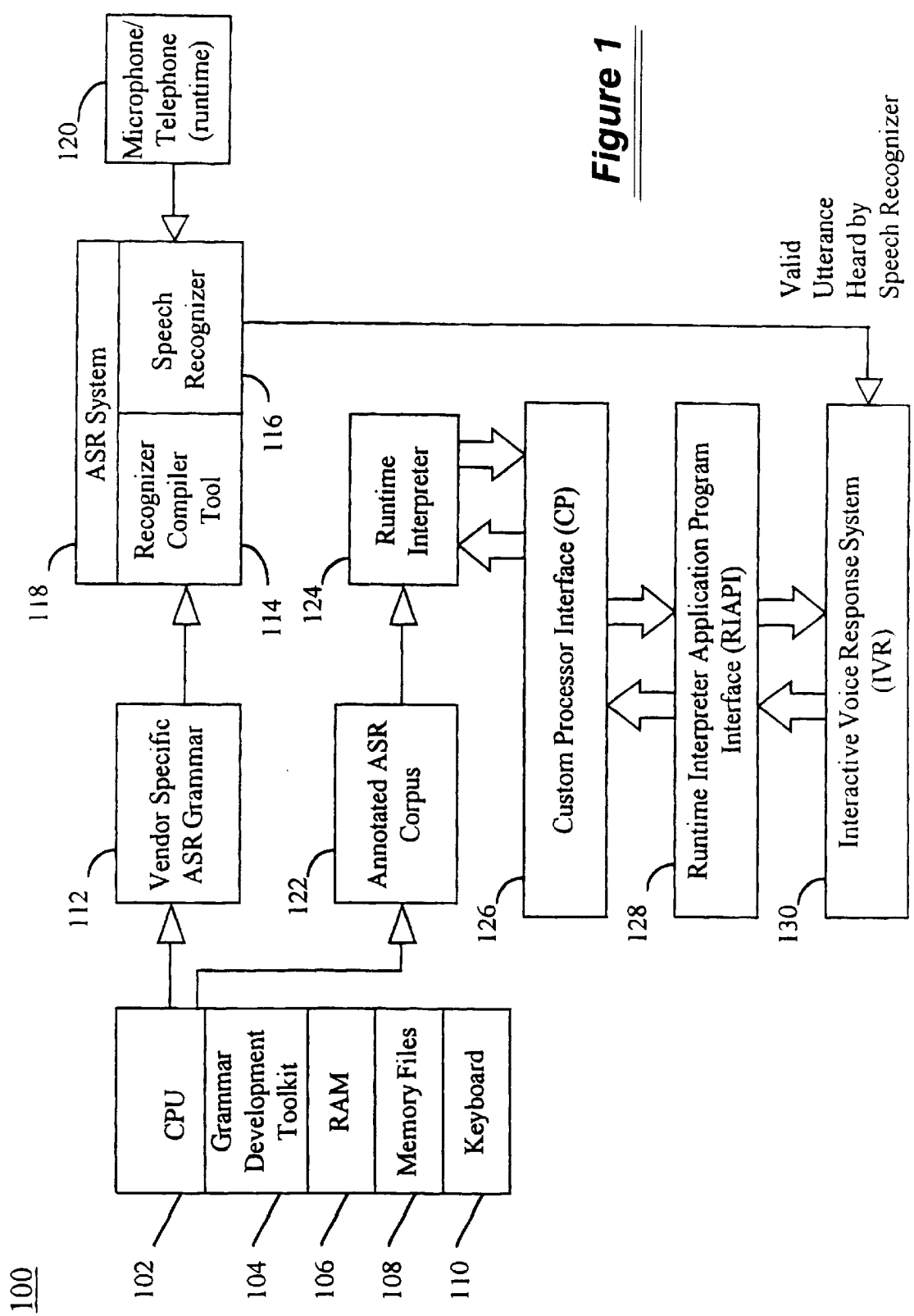
FIG. 1 shows an overview of an embedded natural language understanding system.

Before describing the present invention, several terms need to be defined. These terms, and their definitions, include:

annotated ASR corpus file—data file containing a listing of valid utterances in a grammar, as well as token data for each valid utterance which represents the meaning of the valid utterance to the interactive voice recognition system (IVR 130).

automatic speech recognition (ASR)—generic term for computer hardware and software that are capable of identifying spoken words and reporting them in a computer-readable format, such as text (characters).

cells—discrete elements within the table (the table is made up of rows and columns of cells). In the example rule given with the definition of 'rule' below, each of "I want", "I need" and "food" would be placed in a cell. Furthermore, in the preferred embodiment, the cells containing "I want" and "I need" are vertically adjacent to one another (same column). Vertically adjacent cells are generally OR'd together. The cell containing "food", however, would occur in the column to the right of the "I want" and "I need" column, indicating the fact that "food" must follow either "I want" or "I need" and as such, the cell containing "food" will be AND'd to follow the cells containing "I want" and "I need".

constrained grammar—a grammar that does not include each and every possible statement in the speaker's language; limits the range of acceptable statements.

corpus—a large list.

grammar—the entire language that is to be understood. Grammars can be expressed using a set of rules, or by listing each and every statement that is allowed within the grammar.

grammar development toolkit (104)—software used to create a grammar and the set of rules representing the grammar.

natural language understanding—identifying the meaning behind spoken statements that are spoken in a normal manner.

phrase—the "building blocks" of the grammar, a phrase is a word, group of words, or variable that occupies an entire cell within the table.

rules—these define the logic of the grammar. An example rule is: ("I want"|"I need")("food"), which defines a grammar that consists solely of statements that begin with "I want" OR "I need", AND are immediately followed with "food".

runtime interpreter (124)—software that searches through the annotated corpus (122) whenever a valid utterance is heard, and returns a token representing the meaning of the valid utterance.

runtime interpreter application program interface (RIAPI)—set of software functions that serve as the interface through which the interactive voice response system (130) uses the runtime interpreter.

speech recognizer (116)—combination of hardware and software that is capable of detecting and identifying spoken words.

speech recognizer compiler (114)—software included with a speech recognizer (116) that accepts, as input, a vendor-specific ASR grammar file (112) and processes the file (112) for use in a speech recognizer (116) during runtime.

table—two dimensional grid used to represent a grammar. Contents of a table are read, in the preferred embodiment, from left to right.

token—each valid utterance in the table is followed by a cell that contains a token, where the token is a unique data value (created by the developer when s/he develops the grammar) that will represent the meaning of that valid utterance to the interactive voice response system (130).

utterance—a statement.

utterance, spoken—an utterance that was said aloud. The spoken utterance might also be a valid utterance, if the spoken utterance follows the rules of the grammar.

utterance, valid—an utterance that is found within the grammar. A valid utterance follows the rules which define the grammar.

variable—"place holder" used in the corpus (122) to represent a phrase which has too many possibilities to fully enumerate. For example, the utterance "My favorite number between one and a million is xxx" could result in 999,998 corpus entries, one for each possible number. In the present invention, however, a variable would be used to represent the number in the corpus (122). Thus, a reduced corpus (122) would include just one entry for this utterance: "My favorite number between one and a million is [INTEGER]". The runtime interpreter (124) is able to identify this variable in the corpus, and performs additional processing during runtime to interpret the number.

vendor-specific ASR grammar file (112)—a data file that contains the set of rules representing a grammar, and is written in a format that will be recognized by the speech recognizer compiler (114).

Referring now to the drawings, where elements that appear in several drawings are given the same element number throughout the drawings, the structures necessary to implement a preferred embodiment of an embedded natural language understanding system (100) are shown in FIG. 1. The basic elements comprising:

an interactive voice response system (130), or IVR;

the grammar development toolkit (104);

a compiler (114) and speech recognizer (116), which are part of an automatic speech recognition (ASR) system (118);

an annotated ASR corpus file (122);

a vendor-specific ASR grammar file (112);

the runtime interpreter (124); and the custom processor interface (126), or CP; and the runtime interpreter application program interface (128), or RIAPI. The grammar development toolkit (104) is the focus of this application and is discussed in detail further below. The other elements listed above are discussed in detail in the copending application cited above. However, a general overview of the speech-enabled system will be helpful for a full understanding of the operation and purpose of the toolkit (104).

1. Overview of Embedded Architecture

The following overview discusses the embedded architecture, which employs a single runtime interpreter (124) which may be embedded within the RIAPI (128). There is a second, distributed, architecture which employs a plurality of runtime interpreters. The distributed architecture is discussed in the copending application referenced above.

The first step in implementing a natural language system is creating the set of rules that govern the valid utterances in the grammar. As an example, a grammar for the reply to the question: "what do you want for lunch?" might be represented as:

<reply>: (("I want"|"I'd like") ("hotdogs"|"hamburgers"));

Under this set of rules, all valid replies consists of two parts: 1) either "I want" or "I'd like", followed by 2) either "hot dogs" or "hamburgers". This notation is referred to as Backus-Naur-Form (BNF), where adjacent elements are logically AND'd together, and the '|' represents a logical OR. The preferred embodiment of the present invention generates this type of grammar.

Referring to FIG. 1, the grammar is generated by a developer using the grammar development toolkit (104). The toolkit (104) is a novel spreadsheet-oriented software package that provides the developer of a natural language application with a simplified way of generating a grammar. In the preferred embodiment, the toolkit (104) resides on a computer that contains a central processing unit (102), application specific software (106), memory files (108) and input device such as keyboard (110).

When the developer has completed the grammar using the toolkit (104), two outputs are generated by the toolkit (104) for use in the natural language system. The first such output is a vendor-specific ASR grammar file (112), which is saved in a format that will be recognizable by the speech recognizer (116). Speech recognizer (116) is a continuous speech, speaker independent speech recognizer. Commercially available speech recognizers (116) include the ASR-1500, manufactured by Lernout & Hauspie; Watson 2.0, manufactured by AT&T; and Nuance 5.0, by Nuance. The preferred embodiment of the toolkit (104) is able to generate grammar files for any of these recognizers.

The vendor-specific ASR grammar file (112) contains information regarding the words and phrases that the speech recognizer (116) will be required to recognize, written in a form that is compatible with the recognizer. The file is also optimized to take advantage of peculiarities relating to the chosen speech recognizer (116). For example, experience with the L&H recognizers has shown that L&H grammars perform well if the grammar avoids having multiple rules with the same beginning (three rules starting with "I want"). Optimization of a grammar for an L&H recognizer would rewrite a set of rules from <rule>:(ab)|(ac)|(ad), to <rule2>:a (b|c|d). Here the three rules of 'rule' have been rewritten and combined into the one rule of 'rule2'.

In order to operate and recognize speech, the speech recognizer will need to compile the vendor-specific ASR grammar file (112) using a compiler tool (114) supplied by the recognizer vendor. The preferred embodiment of the toolkit (104) knows, when the grammar is first generated, which speech recognizer (116) will be used and is able to format the vendor-specific ASR grammar file (112) accordingly.

The second output from the toolkit (104) is an annotated ASR corpus (122), which is actually a pair of flat files. The first of the pair is a corpus file, and contains a listing of all possible logical sentences or phrases in the grammar (with the exception of variables, discussed below), the compartments (groups of tables) in which they appear, and a value representing the class of the utterance (sentence) heard. The second is an answers file that maps each utterance class with a token, or data value that represents the meaning of the utterance. These two files will be used by the runtime interpreter (124).

During runtime, a speaker speaks into the microphone (or telephone)(120) attached to the speech recognizer (116). The recognizer (116) identifies the words and phrases it hears and notifies the IVR (130) when a valid utterance has been heard. The IVR (130) is the system which needs the speech understanding capabilities, and includes the necessary external connections and hardware to function (for example, a banking IVR—130 might include a connection to the bank database, a keypad for entering data, a visual display for displaying information, a dispenser for dispensing money, and a speaker for speaking back to the user). This valid utterance is passed, in a computer-readable form such as text, to the IVR (130) which then notifies the runtime interpreter (124) of the utterance that was heard. The runtime interpreter (124) consults the annotated ASR corpus (122) and returns an appropriate token to the IVR (130) for the valid sentence heard by the recognizer (116). This token represents the meaning of the utterance that was heard by the recognizer (116), and the IVR (130) is then able to properly respond to the utterance. The CP (126) and RIAPI (128) serve as software interfaces through which the IVR (130) may access the runtime interpreter (124). It is the IVR (130) that ultimately uses the speech capabilities to interact with the speaker during runtime.

2. The Grammar Development Toolkit

In the preferred embodiment, the toolkit is developed using "Visual Basic"(trademark Microsoft Corp.) operating on a "Pentium"-based (trademark Intel Corp.) computer system. The toolkit is designed to run on a "Windows NT" (trademark Microsoft Corporation). However, it is understood that the present invention can be developed and run on other computer systems using different software.

Figure 2:
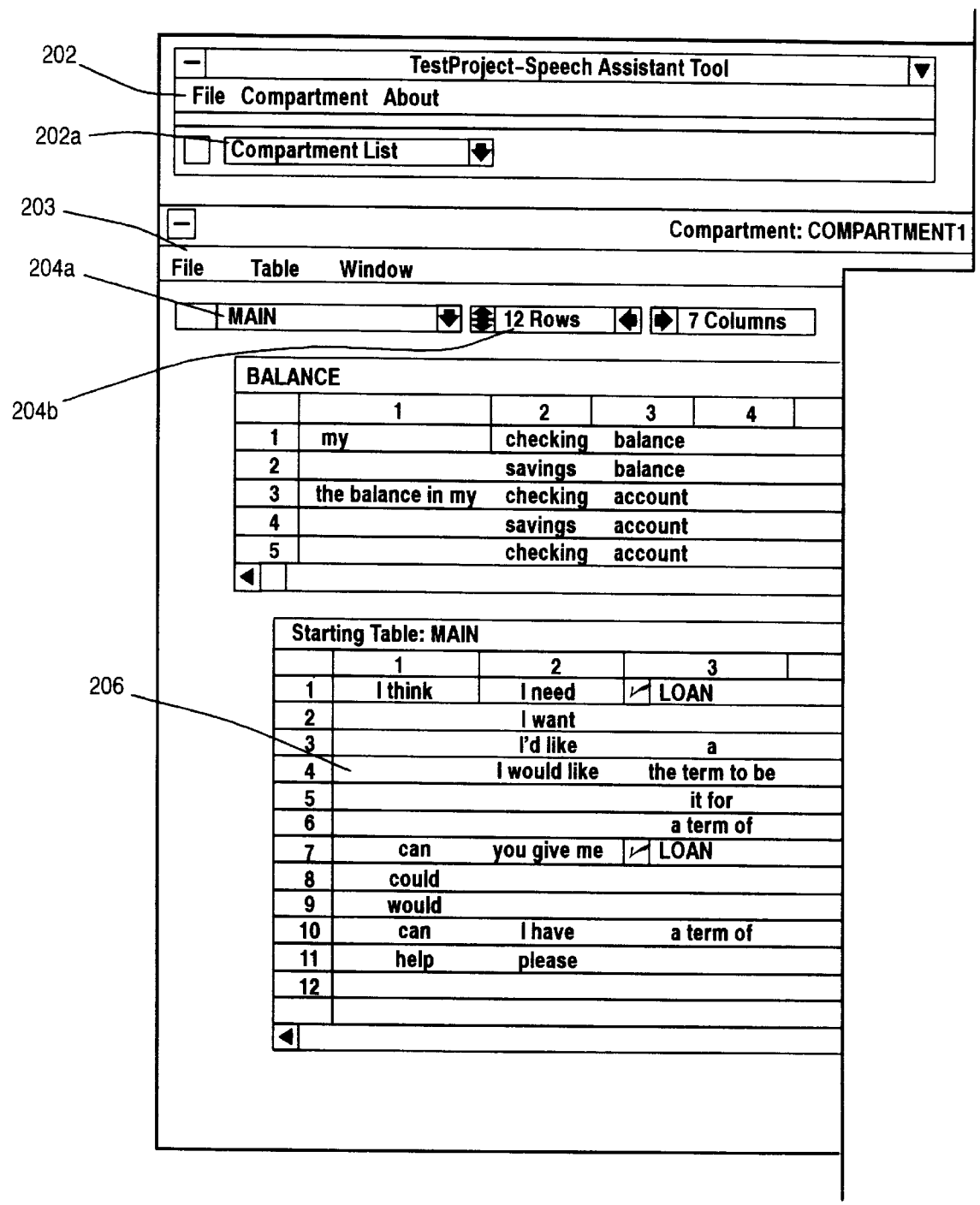
FIGS. 2–2b show the grammar development toolkit main screen.
Figure 2:
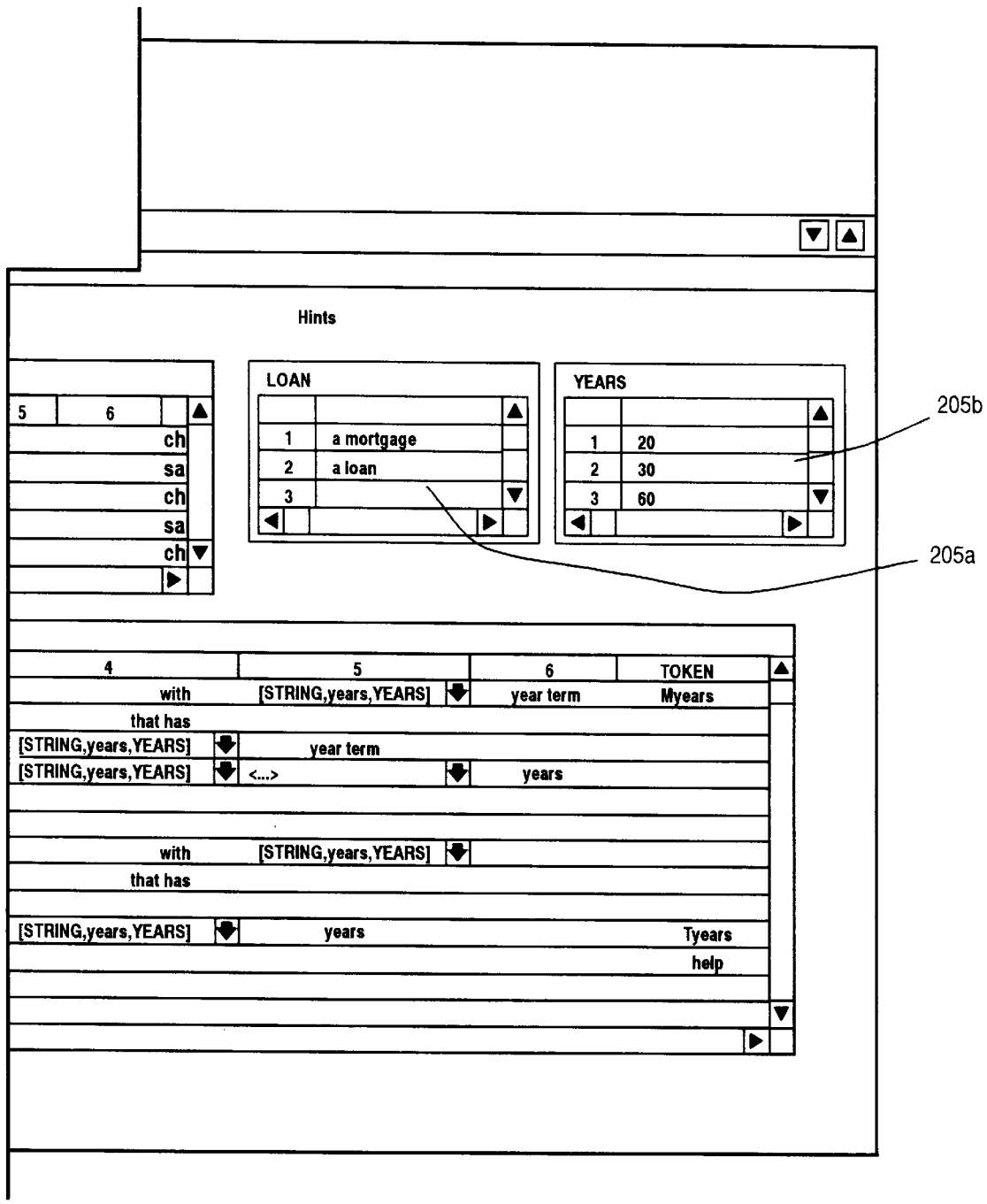

Simply put, the toolkit is a software tool which enables a developer to visualize and create optimized ASR grammars for specified speech recognizers that use a BNF-based language model for recognizing speech. One novel aspect of the toolkit is the spreadsheet format used to visualize the grammar being created. FIG. 2 shows a typical main toolkit screen.

In the preferred embodiment, the toolkit main screen (FIG. 2) displays a table (206) that is within a project. A project is defined as the set of compartments and tables which form the basis of a particular speech application. Compartments contain the one (or more) table(s) related to a particular task within a project. A table essentially contains the tree for valid utterances. Thus, a typical project would be "banking". The "banking," project would contain compartments for the various tasks related to banking such as "account inquiry" and "loan inquiry". Tables within the "account inquiry" compartment would then define the valid utterances which pertain to the topic of an account inquiry.

A table (206) is a matrix where the developer enters data which will be used to generate the grammar, and is composed of rows and columns of cells. Each cell can contain data of one of the following types: Terminal symbols, Non-terminal symbols, Variables and ASR Directives. Terminal symbols are any ASCII string (with the exception of special characters that have specific meaning to either the runtime interpreter 124 or the speech recognizer 116), and they are the basic words and phrases of the language written in text form. Special characters in the preferred embodiment include '!', '/*' and '#' for the L&H recognizer, and parentheses, brackets, braces and carets in general.

Non-terminal symbols serve as a cross-reference to other tables. For example, "LOAN" in row 1, col. 3 and row 7, col. 3 of main table 206 is a non-terminal which references the sub-table 205a. When the main table is processed to generate the corpus file (122) mentioned above, Non-terminal symbols will be replaced with the referenced table. "LOAN" will be replaced with the contents of sub-table 205a.

Variables are a type of Non-terminal symbol that, in addition to referencing another table, return a value to the controlling software (i.e., IVR) during runtime. Col. 3, row 4 in main table 206 is a cell containing the variable "YEARS" which references sub-table 205b. The table referenced by a variable defines the grammar for the variable and will be processed as any other referenced table when the vendor-specific ASR grammar (112) is created. However, variables are not completely enumerated when the corpus file (122) is generated. This is because there would be too many possibilities to list if efficiency is to be maintained. For example, the valid utterance "My favorite number from 1 to a thousand is xxx" results in a thousand different possibilities. Instead of enumerating all of these possibilities, utterances that include variables are written to the corpus file (122) with special characters "holding the place" of where variables will occur in the utterance. Thus, our example utterance would have a single corpus file (122) entry: "My favorite number from 1 to a thousand is [INTEGER1]". When the runtime interpreter (124) searches the corpus file (122) for a detected utterance that includes variables, only the non-variable portion of the detected utterance must match. The variable portion will be interpreted separately using algorithms located in the runtime interpreter (124) (in the example, the algorithm for INTEGER1) and resulting values will be stored in system memory for the IVR (130) to retrieve. In its present embodiment, the variable types which are supported with such algorithms are shown in FIG. 5.

In the corpus file (122), variables are set off from the regular text with square brackets ('[' and ']'). The characters between the brackets identify the variable type and the algorithm which will be processed at runtime when the variable is heard.

ASR Directives are special commands meant for the speech recognizer (116). These cells will appear in the grammar file (112), but not in the corpus file (122). For example, ASR Directives are used in the grammar file (112) to inform the recognizer that there is a variable in the utterance and another table should be referenced.

Cells can also be Marked, Underlined, or characterized as Optional. These features will be explained during the discussion of table traversal below.

All valid utterances in the grammar represented by the table can be obtained by traversing the table from left to right. A valid utterance begins when one of the phrases in the first (leftmost) column is heard. When this first phrase is heard, the range of row numbers for the phrases that are allowed to follow is determined by going up from the first phrase until a barrier line is encountered that also appears in the next column to the right, and going down until a barrier line is encountered which also appears in the next column to the right. Barrier lines are created by underlining cells. These barrier lines form a barrier in the table which is not to be crossed during the enumeration traversal below. The next phrase must be found (if the sentence is to be valid) in the first column to the right of the current column that contains entries within this range of rows. This process is continued until the next non-blank column is a marked column. Each compartment has a main table, and the rightmost column of this main table is the marked column which contains the token to be returned to the IVR (130) for each valid utterance.

Figure 3:
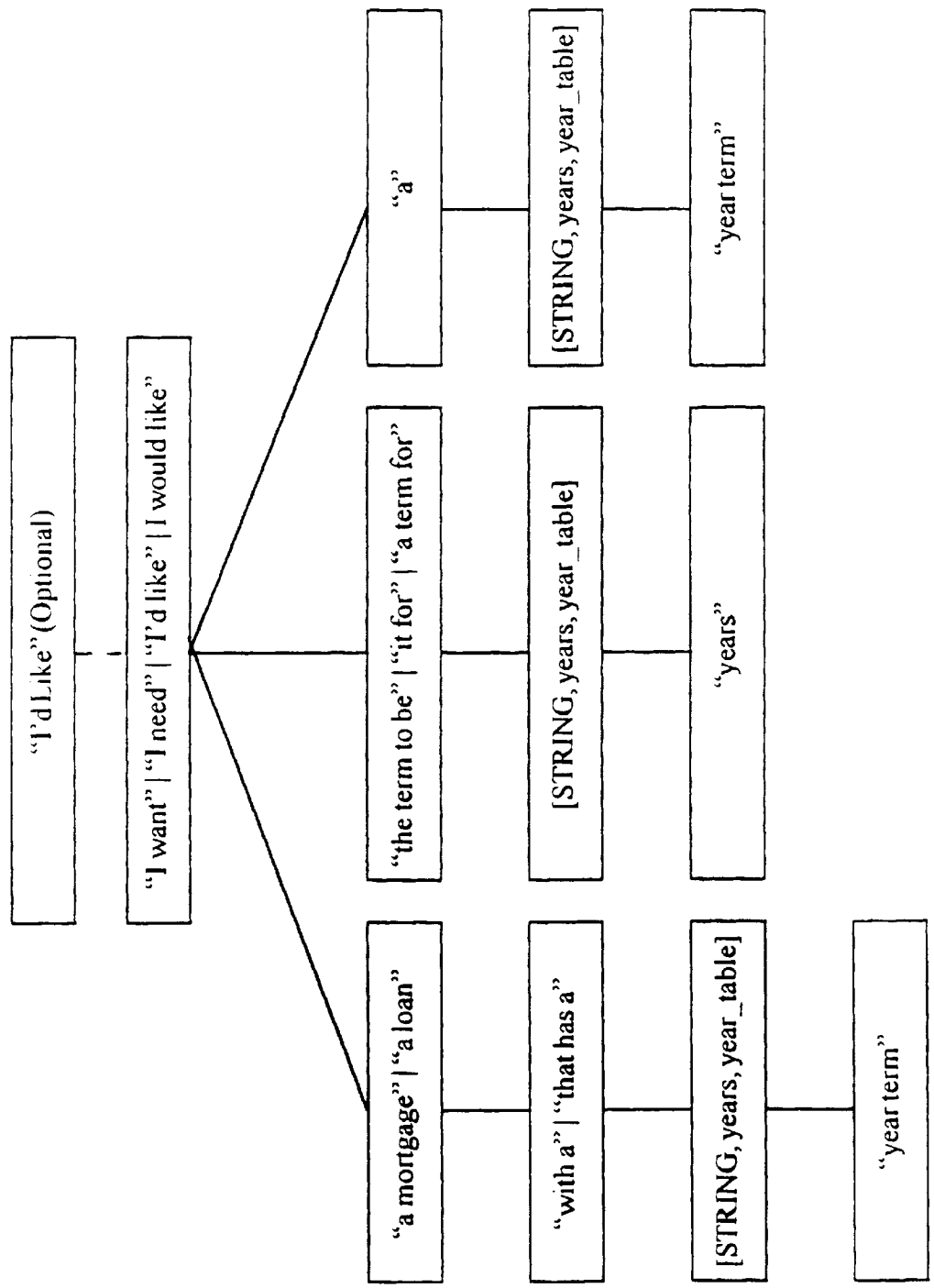
FIG. 3 shows a tree representation of the grammar table in FIG. 2.

For example, using the table in FIG. 2 (and the tree in FIG. 3), if the phrase "I think" was first heard, the range of row values for the next valid phrase is 1 (got to top of column without encountering a barrier line) to 6 (can't cross barrier line under row 7 because it also appears in column 2). The next column that contains entries within this range of rows (skipping any blank ones) is column 2, so the next valid phrase must be found in column 2 between rows 1 and 6. If the phrase "I want" was heard next, it would be valid because this phrase exists in row 2 (between 1 and 6) of column 2. Once "I want" is heard, the process of determining the next valid range begins again, but now starts from the cell containing "I want". Going up and down as before, the next valid range of rows also goes from row 1 to 6, but the next column with entries in this range is column 3. So, the next valid phrase must occur in column 3, between rows 1 to 6. If "the term to be" is heard next, it would be valid. Then, the next valid range of rows would go from 4 to 6 (due to the heavy lines under rows 3 and 6 in the column containing "the term to be"), and the next column with entries in this range of rows is column 4. The traversal is now looking for the "YEARS" variable (20, 30, or 60), and this continues until a complete utterance is processed and the marked column (column 7—"TOKEN") is reached.

During the traversal discussed above, a second "mini-traversal" will take place whenever a non-terminal cell is encountered. A non-terminal cell, as discussed above, simply identifies another table which should appear in place of the non-terminal cell. When a non-terminal cell is encountered during a traversal, the referenced table is traversed in the same manner, and any of the utterances from this "sub-table" may be placed in the non-terminal cell within the current utterance of the main traversal. Functionally, it is as if the referenced table replaced the non-terminal cell in the current table.

Cells may also be characterized as Optional. Each utterance that includes an optional cell will be valid with or without the contents of that cell. Thus, when such an utterance is processed into the annotated ASR corpus (122), the optional cells in the utterance result in multiple corpus items (utterances) to account for the various possibilities. ASR Directives are used in the vendor-specific grammar file (112) to inform the speech recognizer (116) that a particular cell is optional.

Finally, it should be noted that the traversal discussed above demonstrates how a table can be used to check the validity of a given utterance. Another type of traversal is actually performed by the toolkit (104) software. This second type of traversal is used to enumerate all possible valid utterances from the table (with a few exceptions, such as variables), or in other words, the enumeration traversal seeks to "see what's at the end of every valid path through the table" and record the valid utterance formed by each path.

In the preferred embodiment, when the enumeration traversal takes place, the software logically travels completely down one path until it ends (in a Marked column), recording the contents of the cells that it passed through. At that point, one valid path has been completed and the contents of the cells that the path passed through are written, in the order they were encountered, as a valid utterance. The traversal then backs up until the last "branch" (where more than one cell is valid) in the path, maintains the recording of the cells in the path leading up to the branch, and goes down the other "branch" until the end, backs up . . . and so on until all possible paths have been enumerated.

Using the table in FIG. 2 again as an example, an enumeration traversal might start with the valid utterance "I think I need a mortgage with a twenty year term" (where 'twenty' would be a YEAR variable). The next valid utterance, after "backing up" from the end of the first valid utterance until a branch, would be "I think I need a mortgage that has a twenty year term". The branch occurred in column 4, where "with a" and "that has a" both would have resulted in valid utterances. This is merely the type of enumeration traversal performed in the preferred embodiment of the invention, and it is understood that various methods of traversal would also result in a full enumeration. In the preferred embodiment, the list of valid utterances in the corpus (122) need not be in any particular order, so any enumeration traversal method would work. As a note, "thirty" and "sixty" are not considered branches in the preferred embodiment because they are all part of the single variable YEAR, and variables are not completely enumerated. Also, since "I think" is in an optional cell, the valid utterances enumerated above would also be valid if "I think" were removed, so a second valid utterance will be enumerated as well.

A tool (202) is displayed across the top of the toolkit main screen in FIG. 2. This tool allows the user to manage compartments and projects. Under the 'File' menu, the user can create, open or close projects, build an annotated corpus for compartments in the project, select output file destinations and select the speech recognizer format. Under the 'Compartment' menu, the user can generate the grammar file or corpus file for the current compartment. The combo box 202a allows the user to display and select from various compartments within the current project.

Below the tool (202) is the compartment window (203), which is used to create and edit tables within a compartment. The 'File' menu option in the compartment window (203) allows the user to generate compartment grammars and corpora, optimized grammars and corpora, change the printer setup, and save a compartment. The 'Table' menu allows the user to create, open, import, rename, save, delete or print a selected table. The combo box (204a) allows the user to select and display a particular table within the current compartment, while the sizing buttons (204b) allow the user to change the number of rows or columns in the selected table.

In the preferred embodiment, cell attributes (optional, ASR Directive, non-terminal or subgrammar, variable) are set by first pointing, with a mouse, to the cell whose attributes are to be modified, and then pressing the right mouse button. Doing so brings up the menu shown in FIG. 2b. While the preferred embodiment of the present invention employs a mouse, it is understood that selecting cells and opening the menu can also be achieved through other means (control keys, for example). From the menu, various cell functions are available including "Underline" to underline a cell; "Insert Variable" to make a cell a variable; "Insert Subgrammar" to specify a non-terminal and insert the table (or subgrammar) referenced by the non-terminal; and "Insert ASR Option" to insert an ASR directive.

Figure 4A:
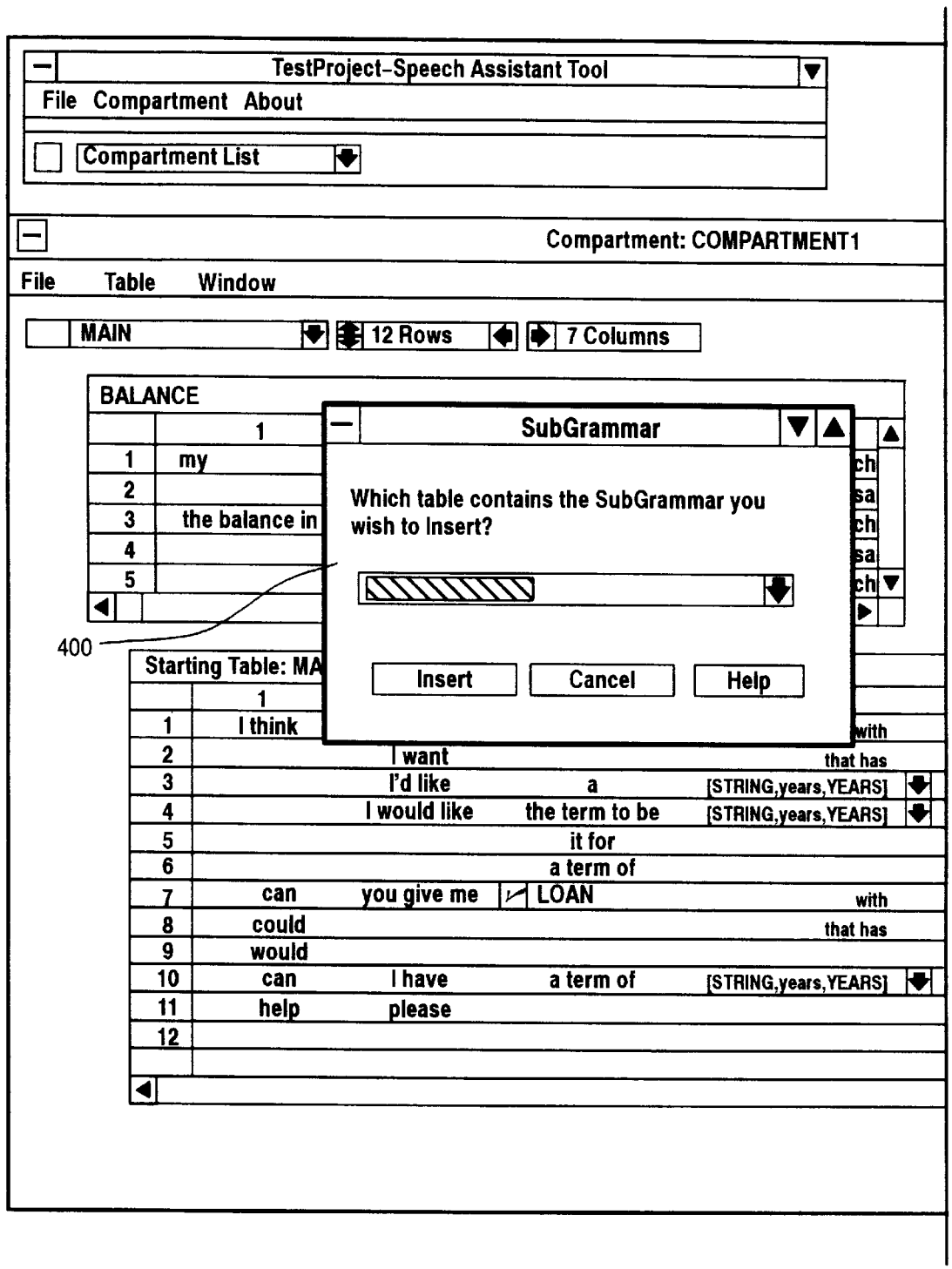
FIGS. 4a, 4b, and 4c show the various cell dialogs.
Figure 4A:
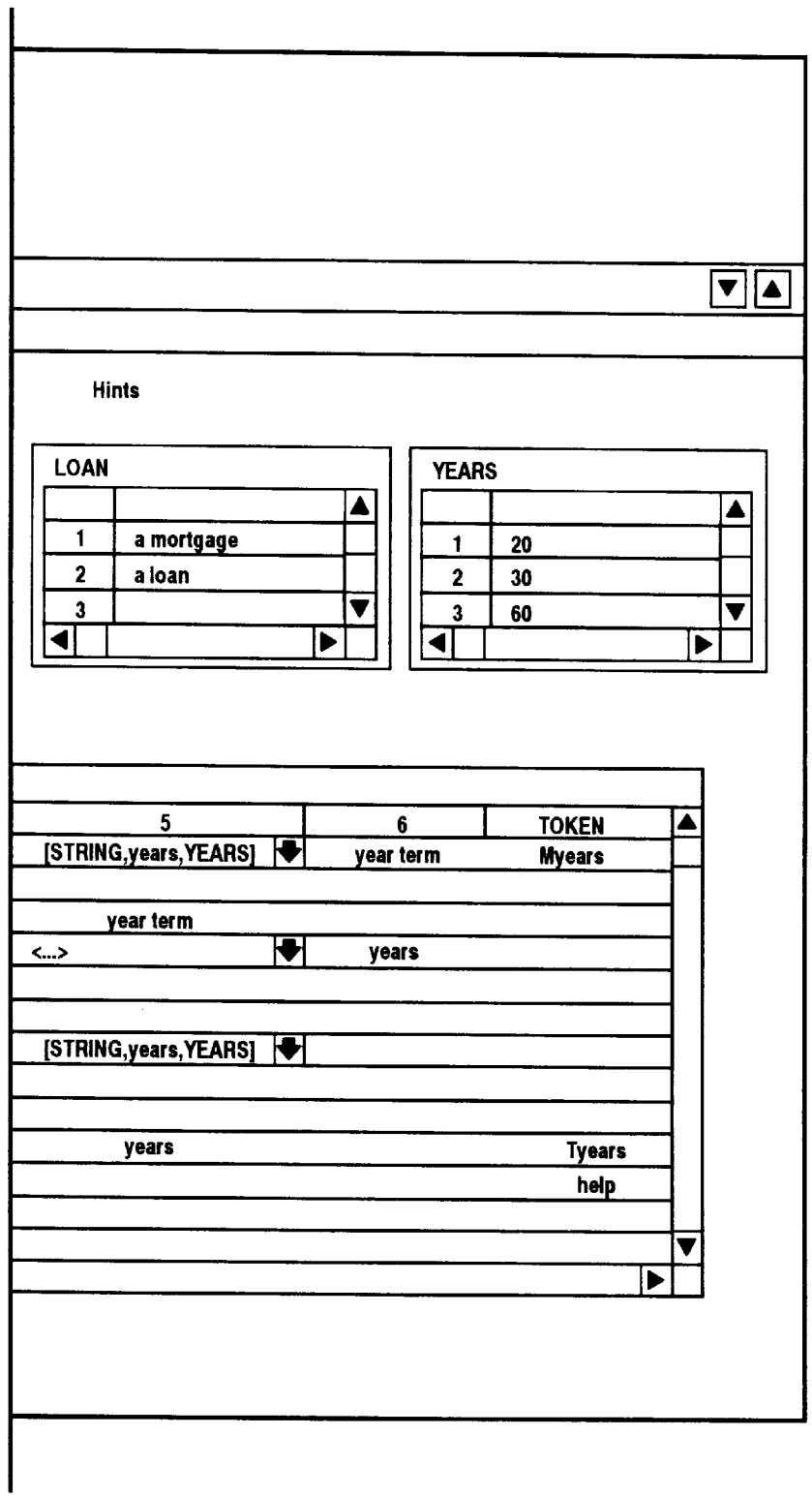
Figure 4B:
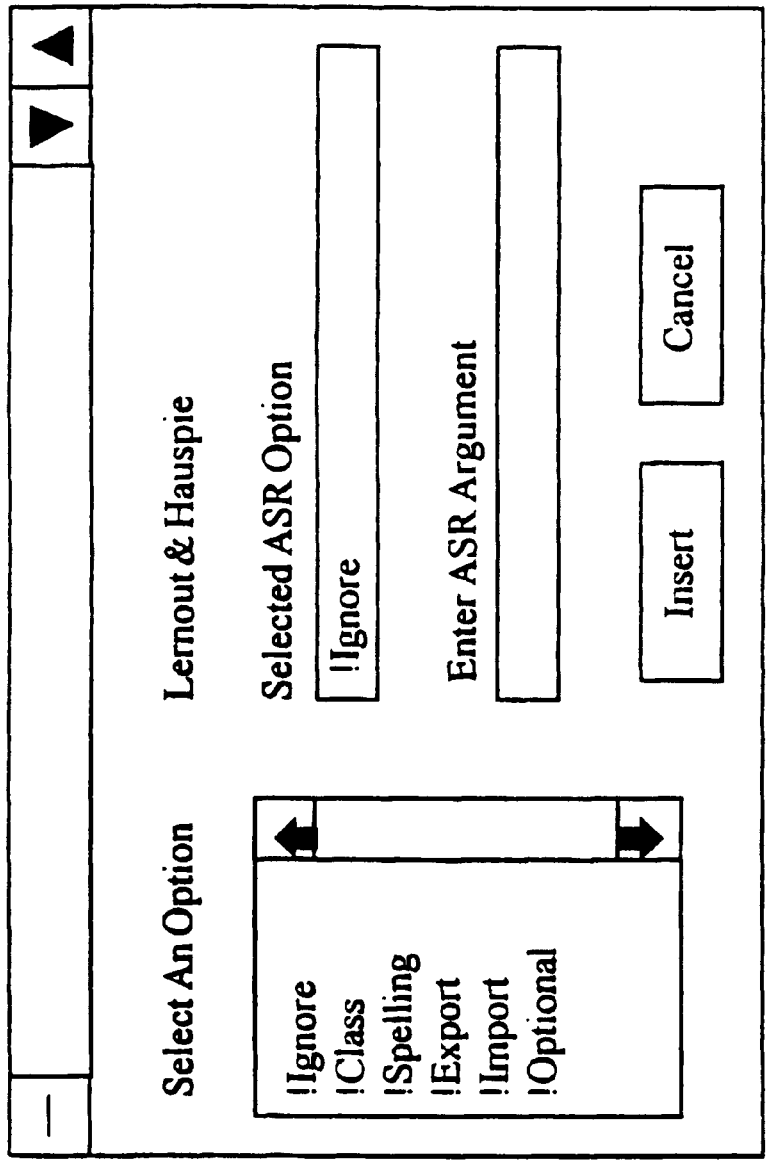
Figure 4C:
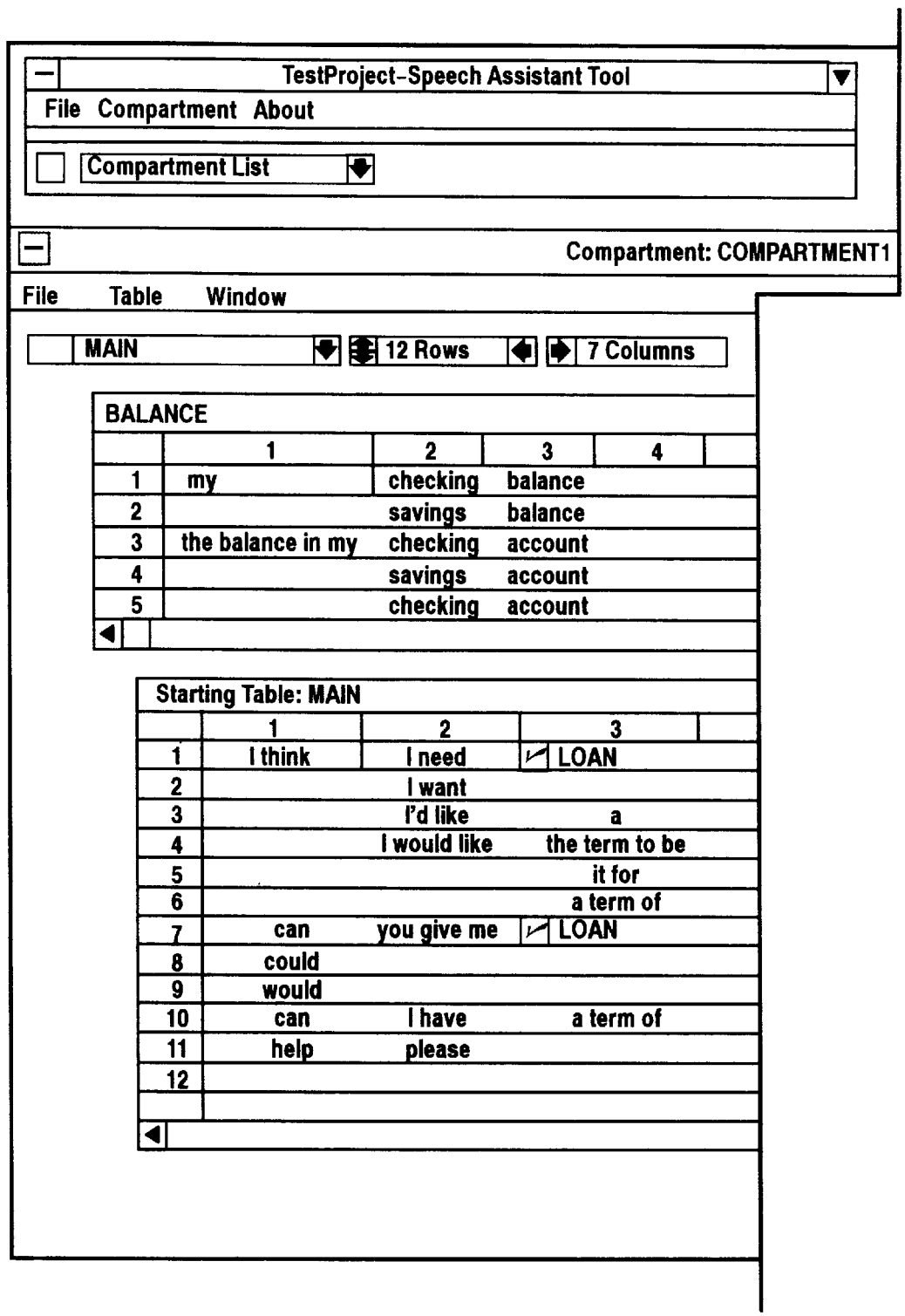
Figure 4C:
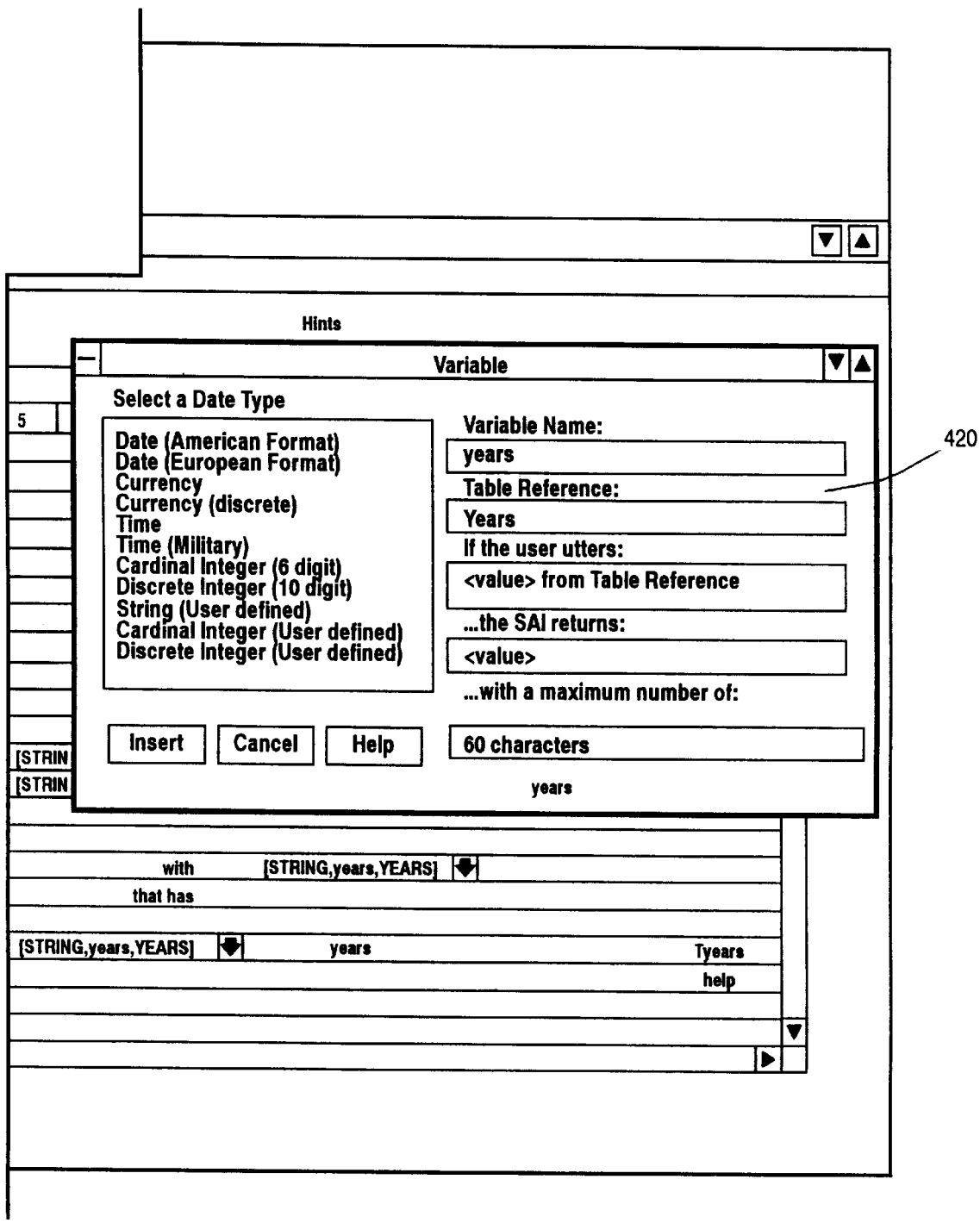

When a cell's attributes are set to Variable, Non-terminal or ASR Directive, one of the dialogs in FIGS. 4a–c will appear. FIG. 4a shows the Non-terminal specifications dialog (400). As defined above, a Non-terminal cell type references another table. This dialog (400) simply prompts the developer for the name of the referenced table.

FIG. 4b shows the ASR Directives Dialog (410), which provides the user with a listbox of the available ASR Directives for the current speech recognizer (116). If the selected ASR Directive requires additional argument data, the developer can provide this additional argument data in the dialog.

FIG. 4c shows the Variable Specification Dialog (420), which is displayed when the developer designates a variable cell. The dialog (420) prompts the developer for the name of the variable, the table that is referenced by the variable, and the variable type. A list of variable types supported by the preferred embodiment, as well as the value type to be returned by the variable, is found in FIG. 5.

Figure 6:
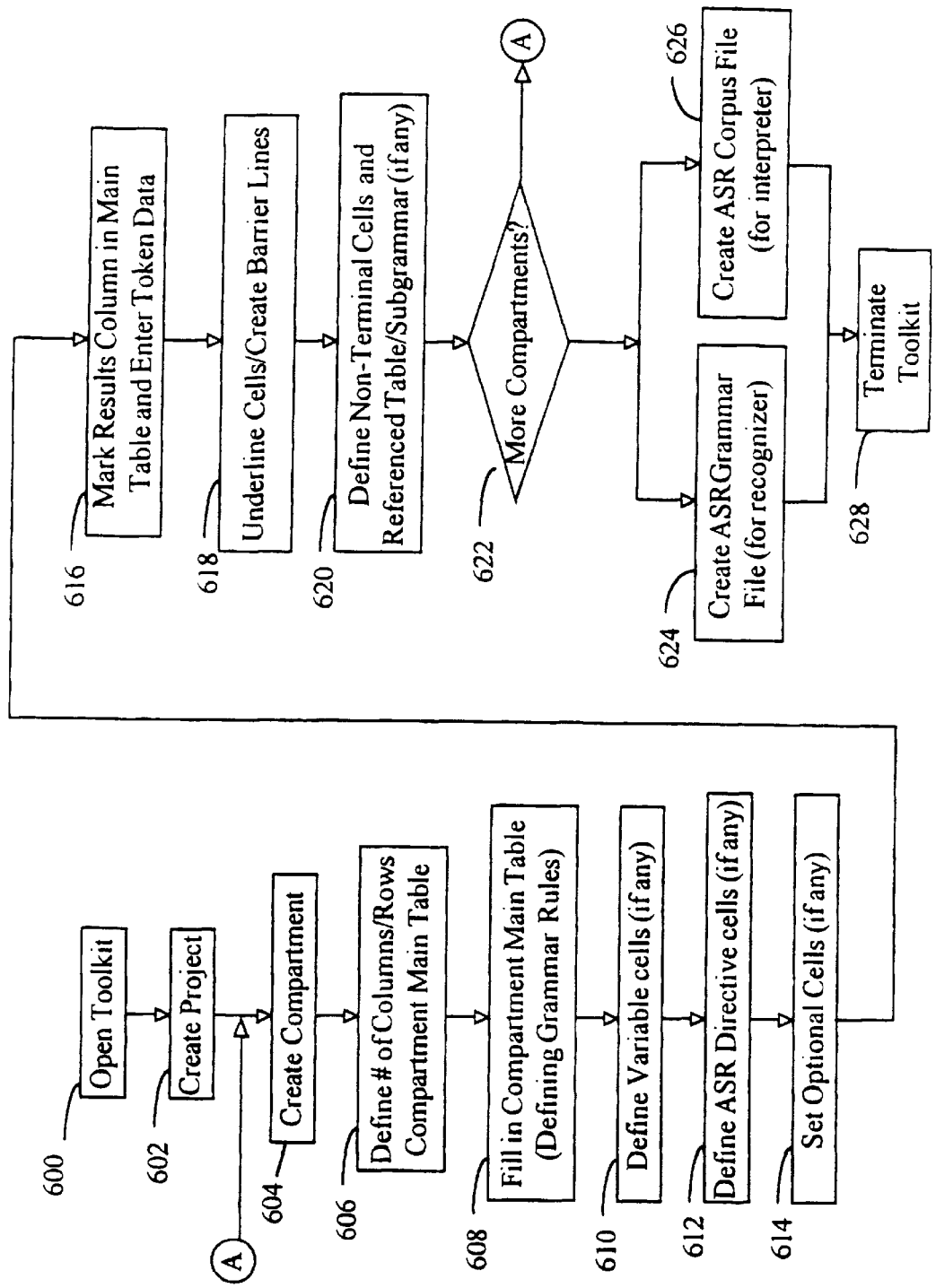
FIG. 6 is a flow diagram showing the use of the grammar development toolkit.
Figure 8A:
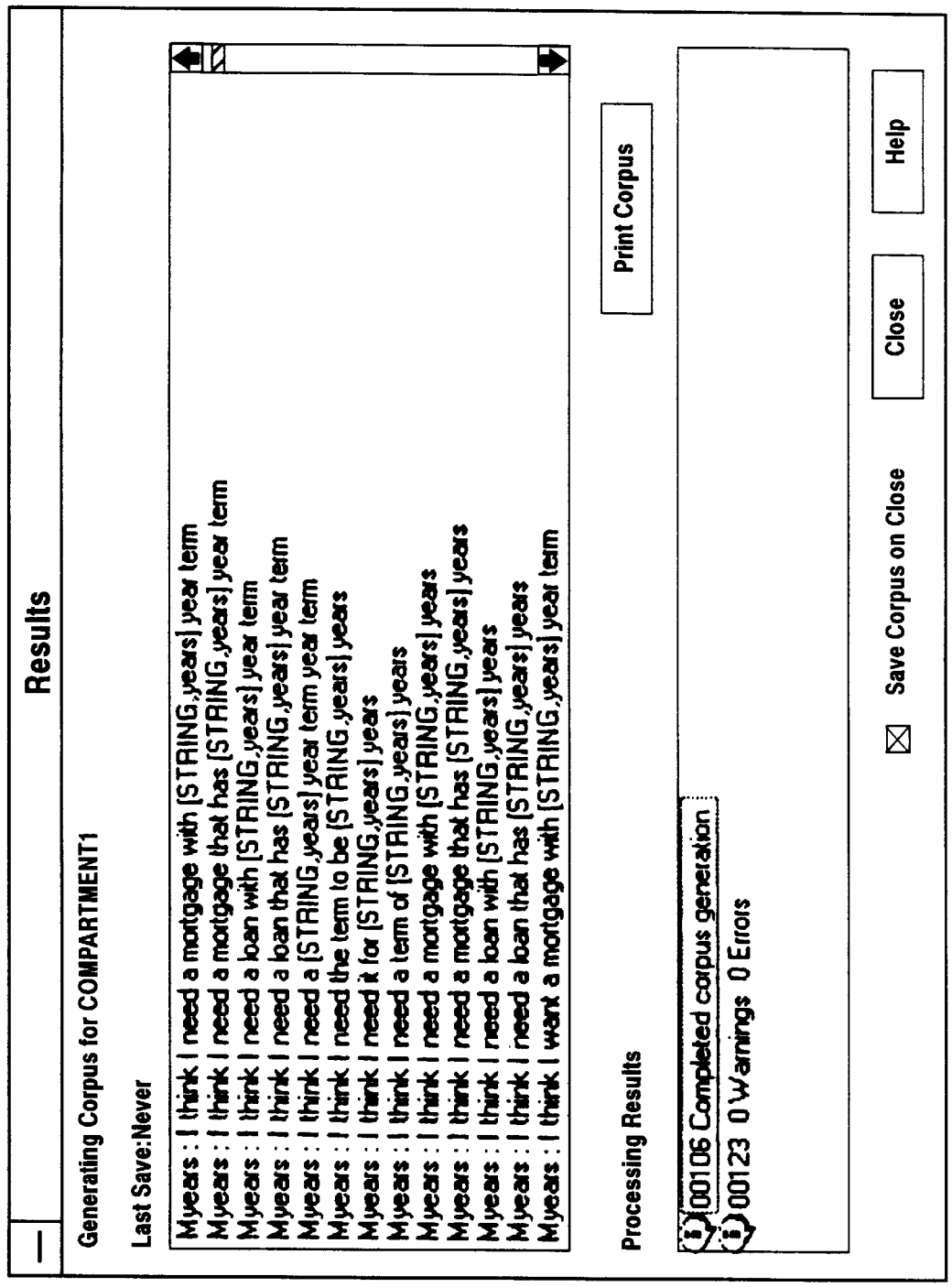
FIGS. 8a and 8b show sample formats for the annotated ASR corpus file and vendor-specific ASR grammar file, respectively.
Figure 8B:
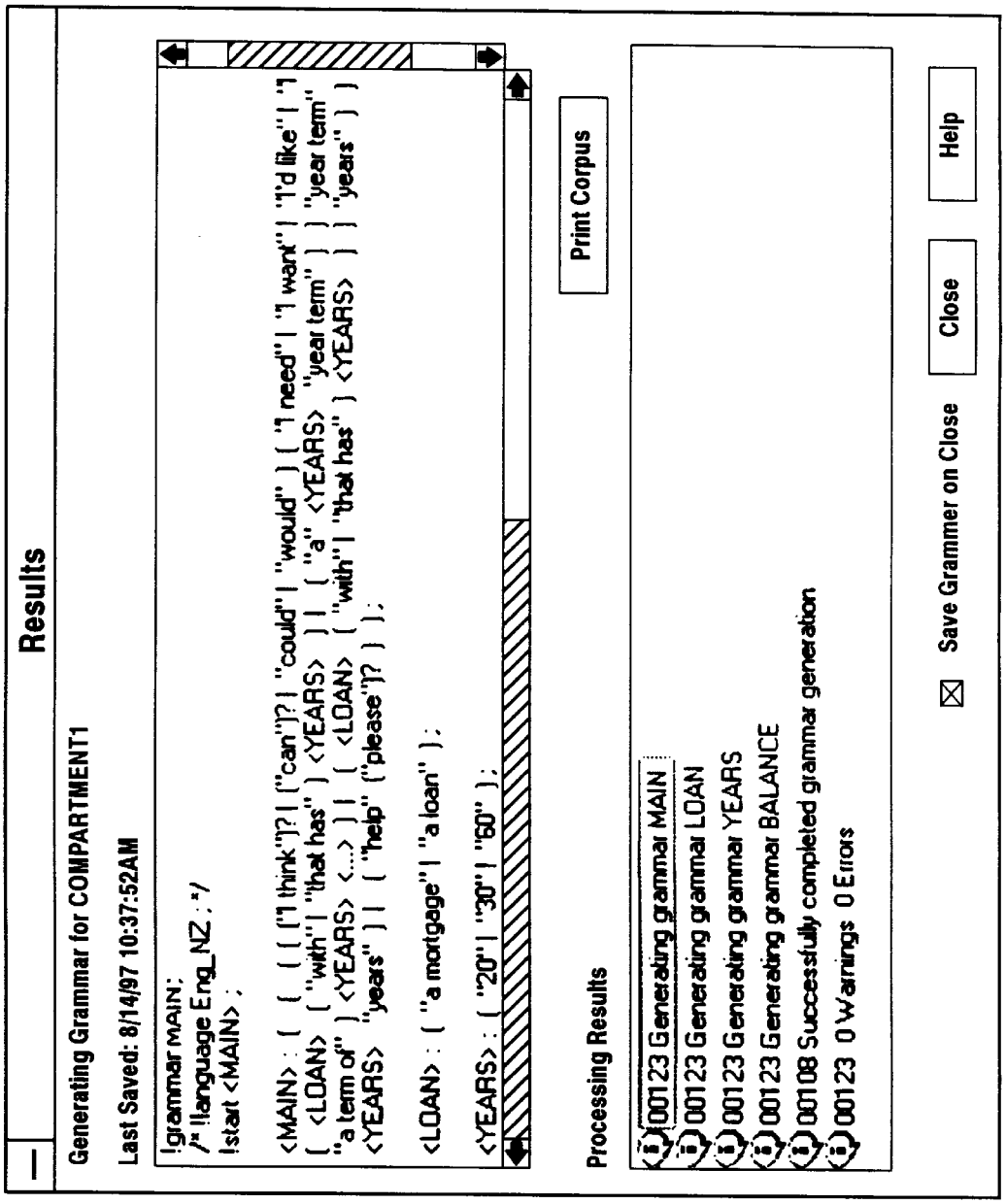
Figure 9:
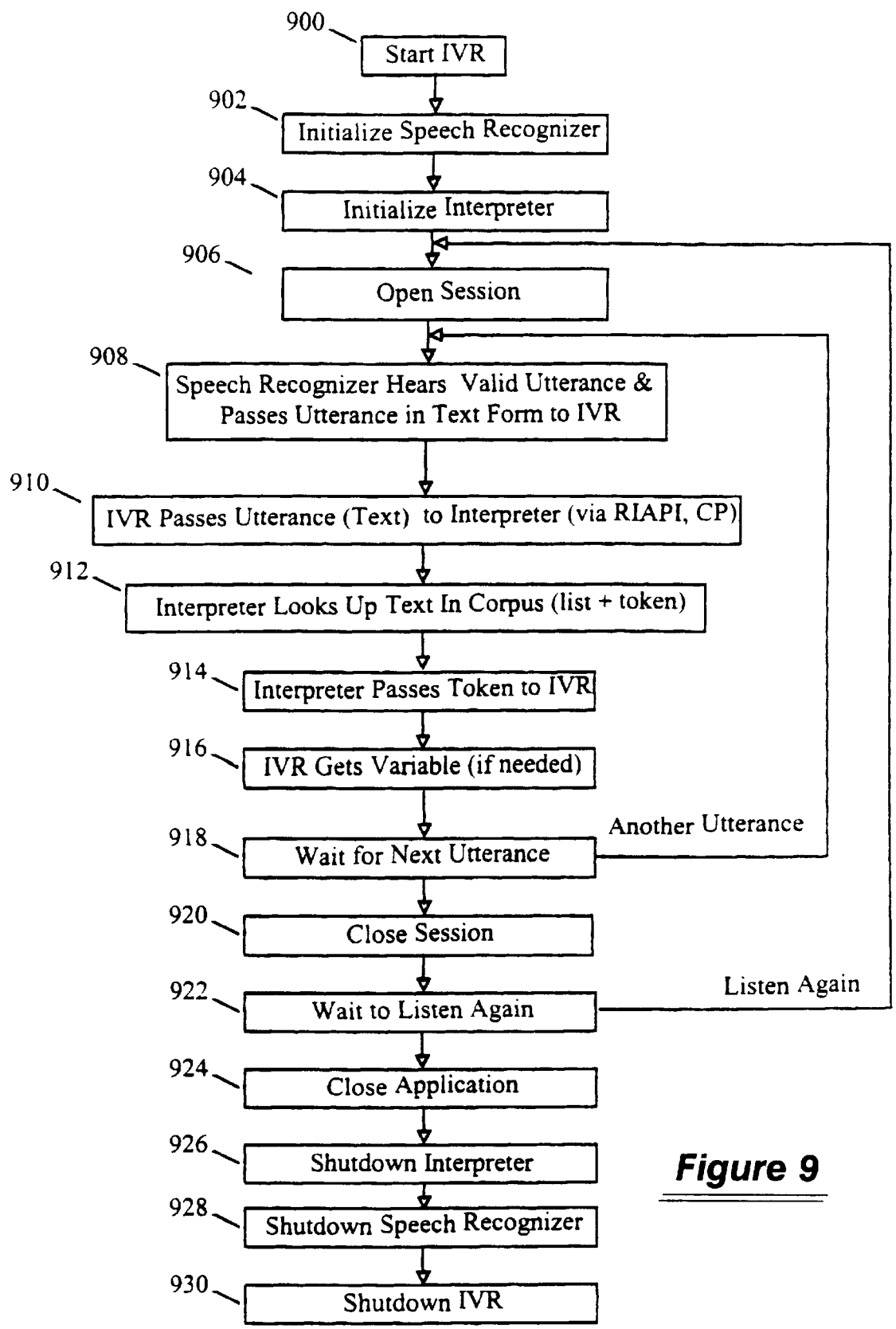
FIG. 9 is a flow diagram showing the operation of the IVR as it accesses the runtime interpreter.
Figure 10A:
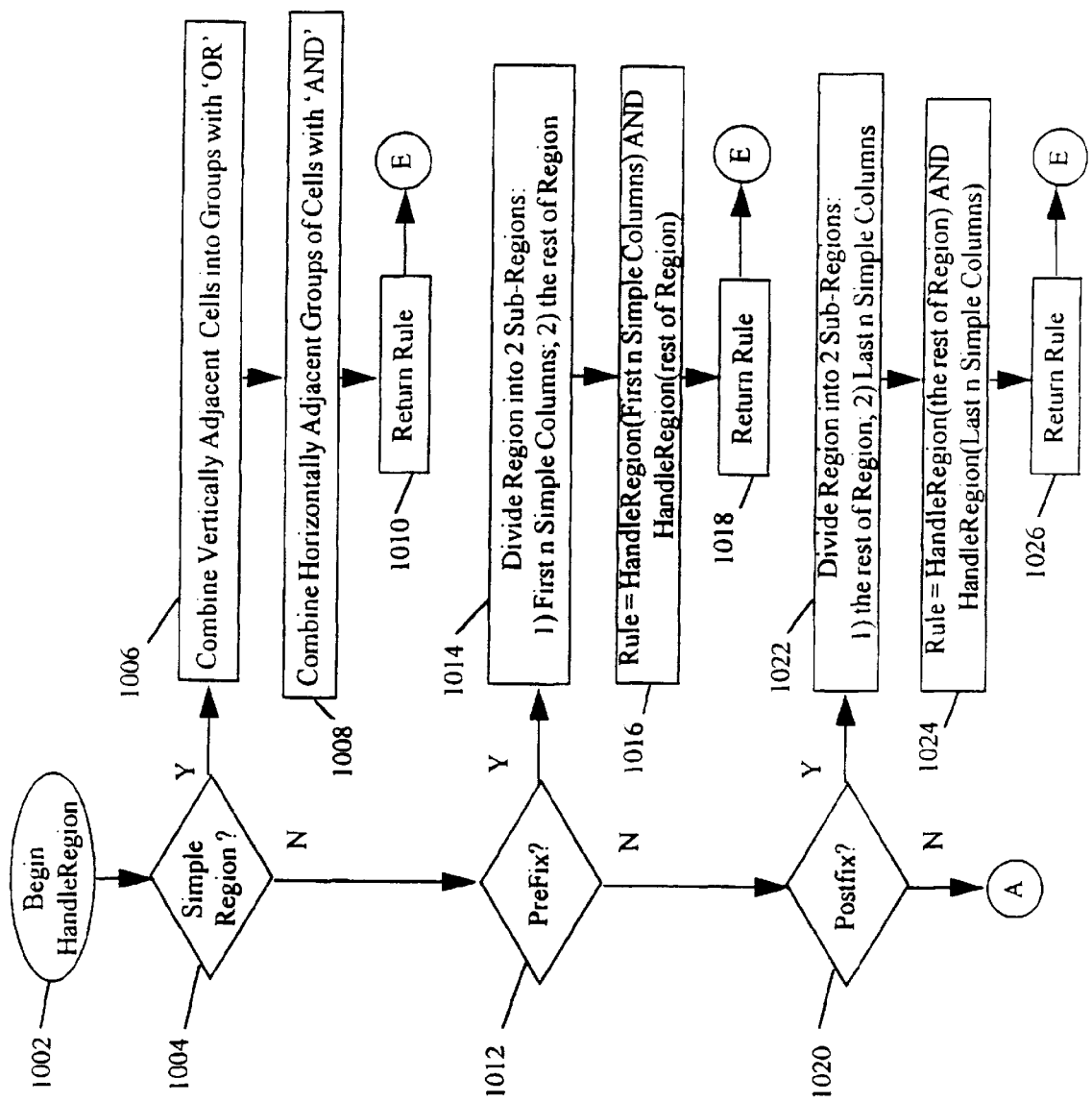
FIGS. 10a–10d are flow diagrams showing the steps taken by the toolkit to extract grammar rules from a table.
Figure 10B:
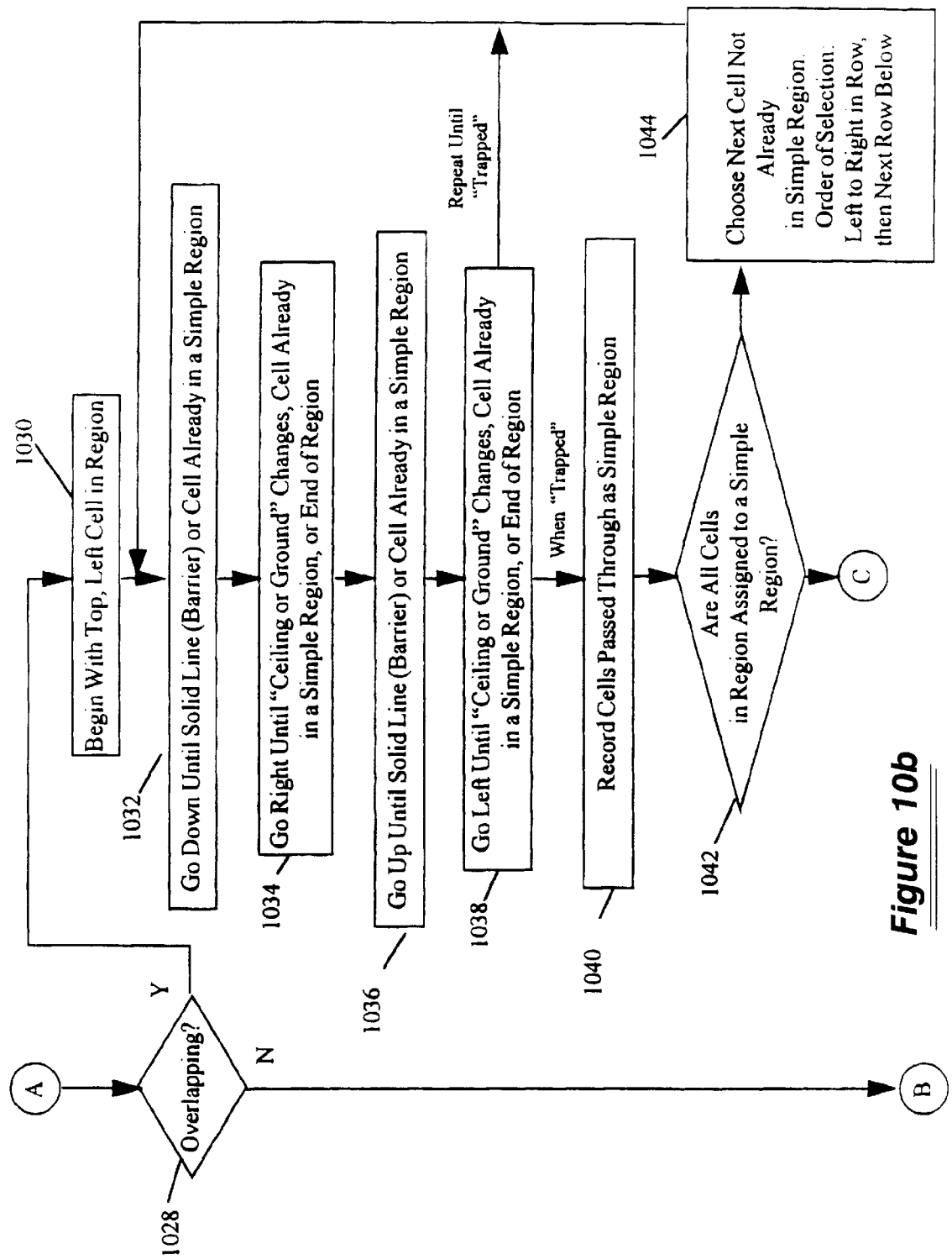
Figure 10C:
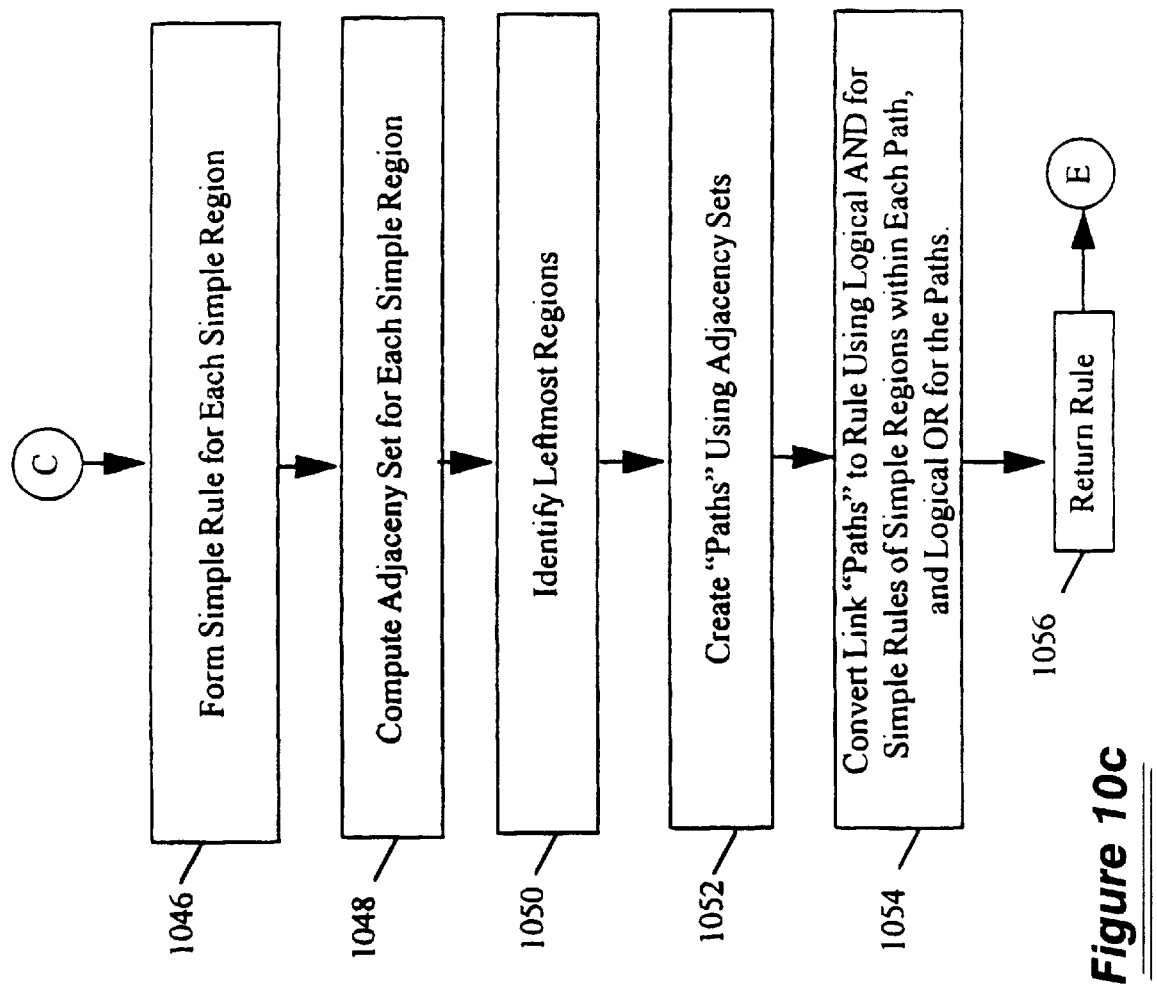
Figure 10D:
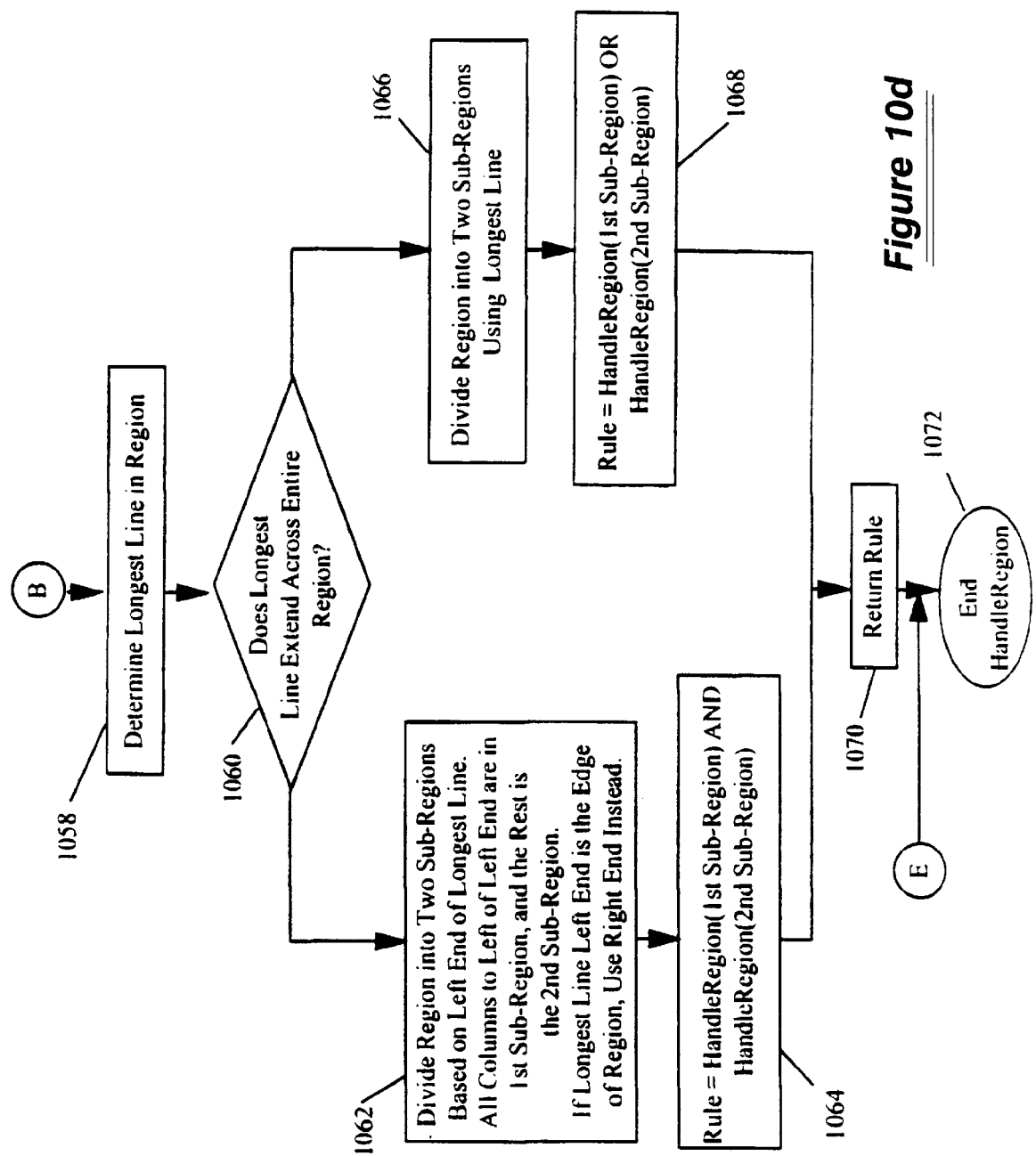

FIG. 6 shows the steps a developer will take when using the toolkit (104) to create a grammar. The developer begins in step 600 by opening the toolkit (104) program. In a typical windowing environment, this will involve selecting an icon. While the preferred embodiment of the toolkit (104) is as an OLE server for inclusion in another vendor-developed toolkit, the toolkit could also be made in a standalone version.

Once the program has begun, the developer will need to open a new project to work on in step 602. The developer then creates a compartment in step 604, and defines the number of columns and rows for the compartment's main table in step 606. This can be done using the sizing buttons (204b). When the size of the compartment main table has been established, the next step (608) is to fill in the cells that are to contain terminal data. As discussed above, terminal data is simply text data that defines the non-variable phrases ("I'd like", "I want", etc.) which are valid in the grammar.

In step 610, the developer fills in the variable cells (if any) of the table. In the preferred embodiment, the variables dialog shown in FIG. 4c is used to define the variable, which includes the variable name and a reference to the algorithm which will be performed when the variable is processed (the actual algorithm is located within the runtime interpreter 124).

In step 612, the developer fills in the cells (if any) which are to contain ASR directives. In the preferred embodiment, the dialog in FIG. 4b is used to select the ASR directive from a list of supported ASR directives for the current speech recognizer (116) (the current speech recognizer is chosen from a list in the 'File' menu of the tool—202).

Figure 2B:
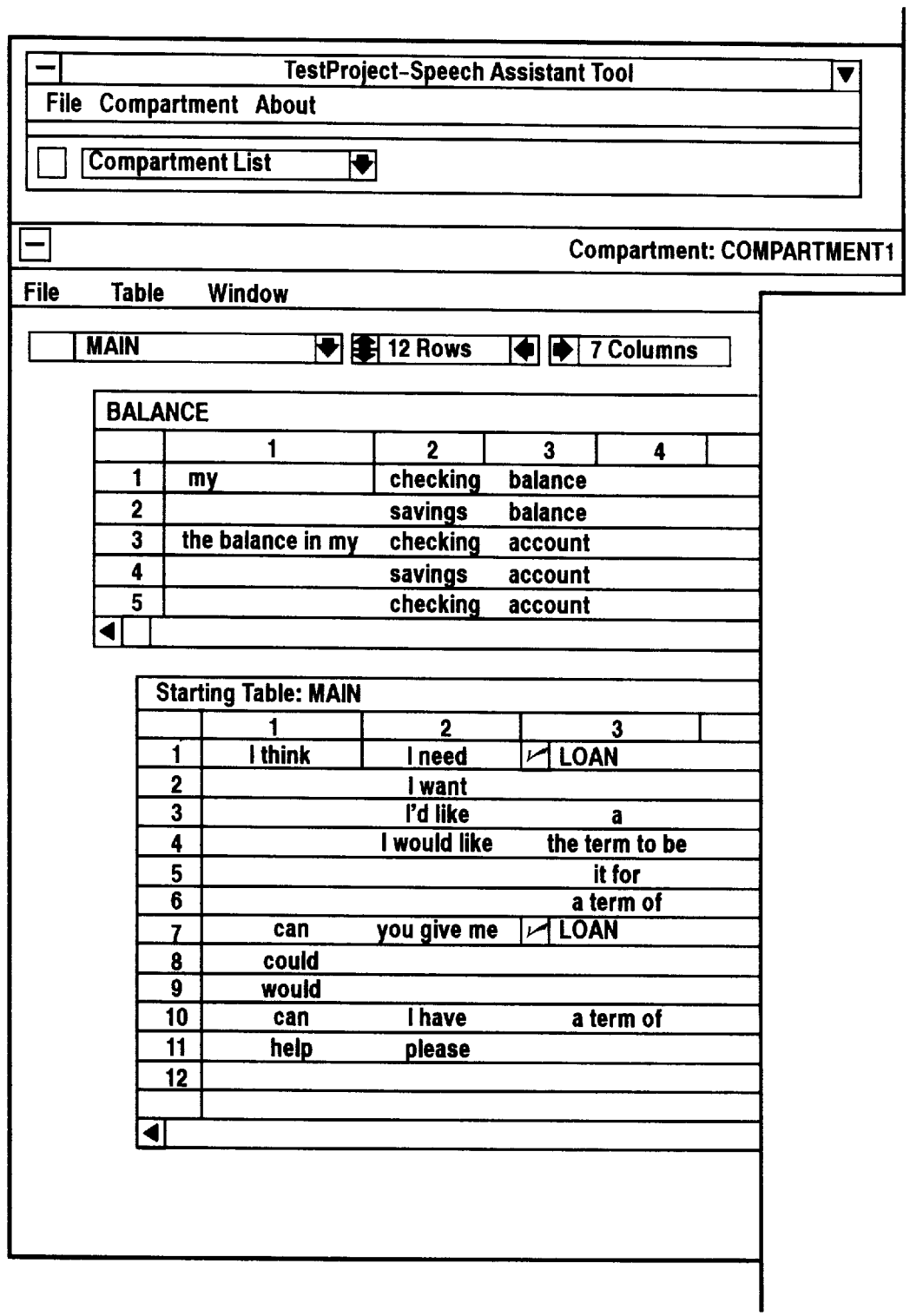
Figure 2B:
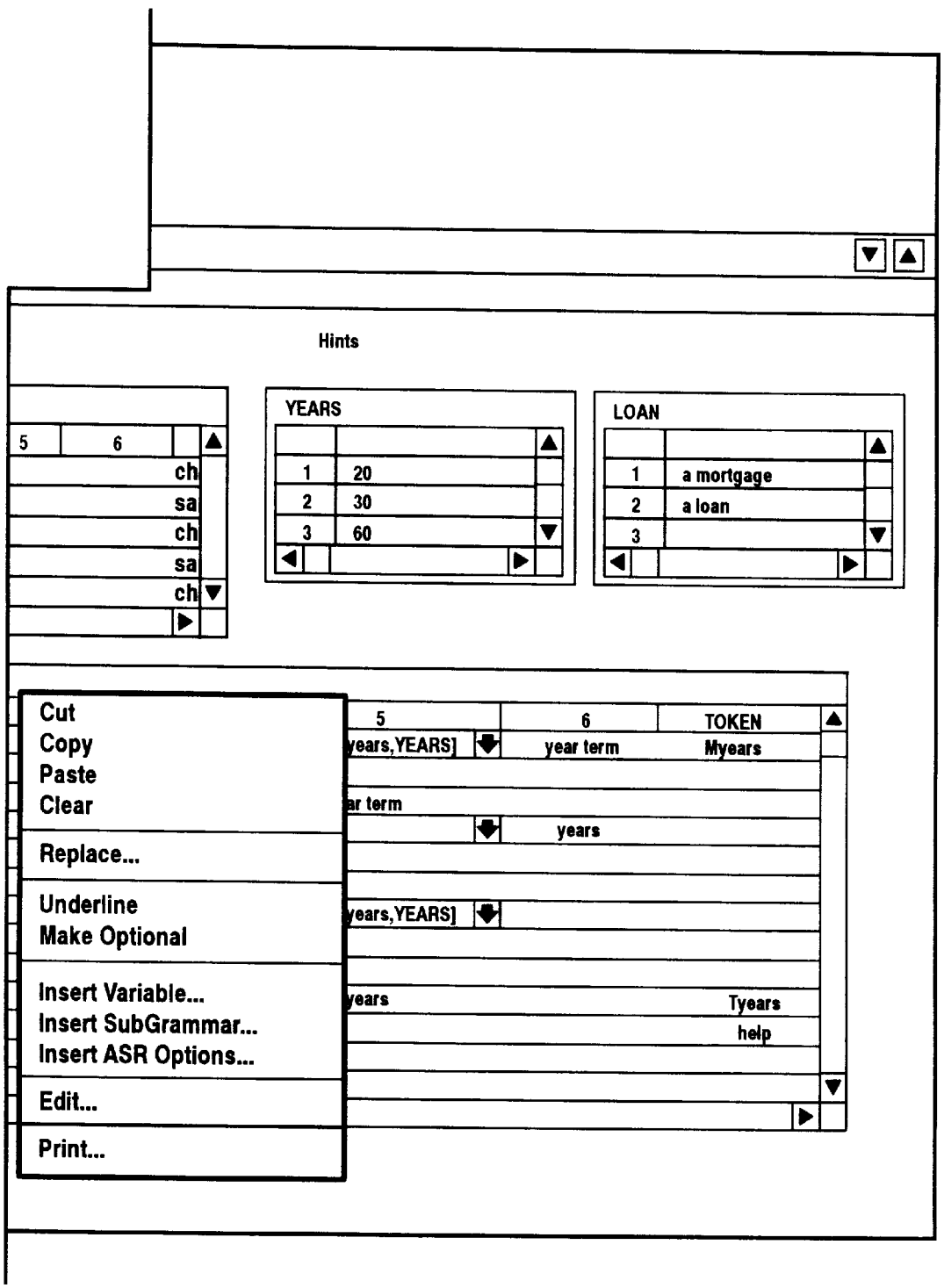

In step 614, the developer identifies which cells (if any) are to be optional by using the right mouse button and the "Make Optional" option of the menu shown in FIG. 2b.

In step 616, the developer identifies and fills in the column in the compartment main table that contains the token data. In the preferred embodiment, the rightmost column of the compartment main table is marked by default as having token data.

In step 618, the developer identifies the barriers used during the traversal discussed above. In the preferred embodiment, this is done by underlining certain cells using the menu shown in FIG. 2b.

In step 620, the developer fills in the non-terminal cells. In the preferred embodiment, this is done using the dialog shown in FIG. 4a. The developer will also need to create a new table to contain the subgrammar, which can be done using the 'table' menu. This table will also need the terminal, non-terminal, variable, optional and ASR directive cell steps discussed above if the referenced table requires any of those cell types. However, in the preferred embodiment, referenced tables do not have marked columns and do not return tokens.

In step 622, the compartment is complete. If another compartment is needed for the project, the developer proceeds to step 604 and creates the new compartment. If no other compartments are necessary, the developer can proceed to either of two steps, 624 and 626. In step 624, the grammar file (112) is generated for the ASR (114, 116). In the preferred embodiment, this process is initiated using the 'File' menu option in the compartment window (203). This generation is done by performing an analysis of the table, and results in a file (112) stored in memory. This file (112) contains the grammar rules embodied in the tables and is in a form that can be compiled and used by the speech recognizer (116).

The analysis performed during generation of the grammar file (112) seeks to generate a set of BNF rules which are followed by valid utterances in the grammar. The generation of the BNF rules begins with a table that has no non-terminals. All non-terminals are replaced with the tables that they reference, resulting in a complete, expanded main table.

Consider the following Tables 1a–e.

TABLE 1a

|  |  | Column | | | |
|---|---|---|---|---|---|
|  |  | 1 | 2 | 3 | 4 |
| Row | 1 | A | B | C | D |
|  | 2 | E | F | G | H |
|  | 3 | I | J | K | L |
|  | 4 | M | N | O | P |

Rule: "(A|E|I|M)(B|F|J|N)(C|G|K|O)(D|H|L|P)".

TABLE 1b

|  |  | Column | | | |
|---|---|---|---|---|---|
|  |  | 1 | 2 | 3 | 4 |
| Row | 1 | A | B | C | D |
|  | 2 | E | F | G | H |

TABLE 1b-continued

|  |  | Column | | | |
|---|---|---|---|---|---|
|  |  | 1 | 2 | 3 | 4 |
|  | 3 | I | J | K | L |
|  | 4 | M | N | O | P |

Rule: "(A|E|I|M)((B|F|J|N)(((C|G|)(D|H))|((K|O)(L|P)))"

TABLE 1c
(with group number)

|  |  | Column | | | |
|---|---|---|---|---|---|
|  |  | 1 | 2 | 3 | 4 |
| Row | 1 | A(1) | B(2) | C(2) | D(2) |
|  | 2 | E(1) | F(2) | G(2) | H(2) |
|  | 3 | I(1) | J(3) | K(4) | L(4) |
|  | 4 | M(5) | N(5) | O(4) | P(4) |

Rule: ((A|E|I)(((B|F)(C|G)(D|H)))|(J(K|O)(L|P)))|(MN((K|O)(L|P)))

TABLE 1d

|  |  | Column | | | |
|---|---|---|---|---|---|
|  |  | 1 | 2 | 3 | 4 |
| Row | 1 | A | B | C | D |
|  | 2 | E | F | G | H |
|  | 3 | I | J | K | L |
|  | 4 | M | N | O | P |

Rule: "((AB)|((E|I|M)(F|J|N)))(((C|G|K)(D|H|L))|(OP))"

The main process, in the preferred embodiment, of generating the grammar rules which represent the table is shown in the flow diagram of FIGS. 10a–d. Titled "HandleRegion", this flow diagram shows the recursive algorithm used. HandleRegion itself receives a table, or portion of a table, as input. In the preferred embodiment, any non-terminals originally found in the tables given to HandleRegion are replaced with the sub-tables that they reference before HandleRegion is called. Tables are represented by a two-dimensional array, and defined by their corners (i.e. row1,col1–row4,col4). HandleRegion assembles the grammar rules defined by the table by recursively dividing the table into smaller and smaller tables ("regions") until "simple" regions are formed. A simple region is a region of cells in which there are no heavy lines (barriers). Table 1a depicts a simple region.

Once HandleRegion is begun (step 1002), a check is made to determine whether the region to be handled is a simple one. If a rule is to be extracted from table 1a, then this check succeeds. When the region is a simple one, vertically adjacent cells are grouped using logical 'OR' (step 1006). In table 1a, four groups would be formed, one for each column. The groups would be, (A|E|I|M), (B|F|J|N), (C|G|K|O) and (D|H|L|P), where the '|' represents logical 'OR'. Then, these groups would be combined in a left to right order using logical 'AND' (step 1008), resulting in "(A|E|I|M)(B|F|J|N) (C|G|K|O)(D|H|L|P)". This rule is returned in step 1010 and HandleRegion ends in step 1072.

If the region to be handled is not a simple one, such as the one shown in table 1b, then the check in step 1004 fails, and the process moves on to step 1012. In step 1012, the region to be handled is checked to see if it is a "prefixed" region. A prefixed region has no barrier lines in the first 'n' columns (these are simple columns), and thus, table 1b is a prefixed region because it has no barrier lines in its first 1 column. In step 1014, the prefixed region is divided into two sub-regions. The first sub-region is the leftmost n columns (contains A, E, I and M), and the second sub-region is the rest of the prefixed region. In step 1016, the rule for the prefixed region is defined as the rule for the first region AND the rule for the second region. HandleRegion is then recursively called once to find the rule for the first region, and again to find the rule for the second region. In step 1018, this rule is returned and HandleRegion ends in step 1072.

If, in step 1012, the region is not a prefixed region, it is checked (step 1020) to see if it is a "postfixed" region. A postfixed region is the reverse of a prefixed region, and has no barrier lines in the last 'n' columns. If the region is a postfix region, it is divided in step 1022 into two sub-regions, one for the rightmost n columns, and another for the rest. Step 1024 defines the rule for the region as the logical AND of the two sub-regions, much like step 1016 for the prefixed region. Again, the rule is returned (step 1026) and HandleRegion ends in step 1072.

If, in step 1020, the region is not a postfixed region, it is checked (in step 1028) to see if there are any "overlapping" barriers in the region. Overlapping barriers occur in columns which have more than one barrier, and table 1c contains an overlapped column (column 2). If overlapped columns exist in the region, then a cell-by-cell approach is used to determine the simple regions contained within. In step 1030, the process starts with the top, left cell in the region to be handled. The contents of this cell ('A') are added to the current simple region being defined.

Then, in step 1032, the process attempts to go down the current column until a barrier line is encountered. Cells that the process enters are added to the current simple region. In table 1c, the process can go down until cell 'I', and each cell that it enters is added to the current simple region (so far, 'A', 'E' and 'I' are in the current simple region). At this time, a "ceiling" and "ground" are noted. The "ceiling" is the first barrier or border in the current column above the current cell (border above 'A'), and the "ground" is the first barrier or border in the current column that is below the current cell (barrier under 'I' in row 3). In step 1034, the process attempts to go right until either the "ceiling" or "ground" of the next cell to the right is different. In the example using table 1c, after 1032, the process is at cell 'I'. It then attempts to go right, to cell 'J'. The "ground" under 'J' is the same (barrier still under row 3), but the "ceiling" is different. The first barrier or border above 'J' is NOT the border above 'A' (which was the case for 'I'), but the barrier under 'F'.

Thus, the process has gone right until the "ceiling" changed. The process would also stop going right if the rightmost border of the region was encountered or if the cell to the right has already been assigned to a simple region by the overlapping process.

When the process stops going right, it then tries, in step 1036, to go up until the next barrier, border, or cell that has already been assigned to a simple region. In the current example, the process never left 'I' because 'J' (the next cell) had a different "ceiling". When the process tries to go up, the next cell is 'E', which has already been assigned to the current simple region, so the process remains at 'I' and is done going up.

When the process stops going up, it then tries, in step 1038, to go left until the "ceiling" or "ground" changes, the left border of the region is encountered, or the next cell to the left has already been assigned to a simple region. In the example, the process is still at 'I', and cannot go left because it would encounter the left border of the region. After trying to go left in step 1038, the process repeats steps 1032–1038 until the process is "trapped". The process is "trapped" when it can no longer move down, right, up or left. In the example, the process is already trapped a 'I'. It can't go down due to the barrier under 'I', it can't go right because the ceiling would change, it can't go up because 'E' has already been assigned to a simple region (this one, as a matter of fact), and it can't go left because of the left border of the region. The process is done determining what cells are in the first simple region, and records (in step 1040) the fact that cells 'A', 'E' and 'I' are in the first region.

In step 1042, the overlapping process checks to see if all cells have been assigned to a simple region. If not, the process goes to step 1044, which chooses the next cell to be assigned to a simple region. This selection is done from left to right across the current row, and when a row is done, the first cell of the next row is chosen. In our example, the first simple region began with the top, left cell ('A'). The next cell to the right that isn't already part of a simple region is 'B', so 'B' is the next starting point.

Going again through steps 1032–1040 starting at 'B', the process goes down until (and including) 'F', right until (and including) 'H', up until (and including) 'D', and left until (and including) 'C' before becoming trapped at 'C'. Thus, the second simple region contains 'B', 'C', 'D', 'F', 'G' and 'H'. Since the second simple region started with 'B', the process considers 'C' as its next starting cell. 'C' is already assigned, so are 'D', 'E', 'F', 'G', 'H' and 'I'. Thus, the next starting cell will be 'J'.

Going through steps 1032–1040 starting at 'J', the process can't go down because of the barrier, can't go right because the ground would change, can't go up because of the barrier, and can't go left because 'I' has already been assigned to a simple region. So 'J' is its own simple region.

Going through steps 1032–1040 starting at 'K', the process goes down until 'O', right until 'P', up until 'L' before it is trapped at 'L'. The fourth simple region contains 'K', 'L', 'O' and 'P'. The next starting point would be 'M', and the last simple region would contain 'M' and 'N'.

After the simple regions have been defined, a simple rule for each simple region is determined in step 1046. This will essentially perform the same functions as steps 1006 and 1008, where vertically adjacent cells are combined into groups with logical 'OR', and horizontally adjacent groups are combined with logical 'AND'.

In step 1048, adjacency sets are computed for the simple regions which share at least one common vertical border. When a pair of simple regions shares such a border, the region on the left "points" to the region on the right in the adjacency set. Table 1c also shows the various simple regions in the example. Simple region 1 shares a border with both simple regions 2 and 3, so the adjacency set would include an entry linking 1→2, and another for 1→3, where the '→' represents "points to". In the example, the computed adjacency set would contain: 1→2, 1→3, 3→4 and 5→4. Entries would also be computed for the rightmost regions, these entries point to END. In our example, the additional entries would be 2→END and 4→END.

Then, in step 1050, the leftmost regions are identified. These would be represented as BEGIN→1 and BEGIN→5. In step 1052, "paths" from BEGIN to END are created by substituting elements from the linked list into one another. In our example, one path would be: BEGIN→1→2→END;

another would be BEGIN→5→4→END; and the last would be BEGIN→1→3→4→END. Finally, in step 1054, each path is converted to a rule by discarding the BEGIN and END, substituting logical 'AND' for the '→' and replacing the region numbers with the simple region rules generated in step 1046. These rules, one for each path, are then combined using logical 'OR' to form the one rule for the overlapping region. This one rule is returned in step 1056, and the HandleRegion process ends in step 1072.

If, in step 1028, the region to be handled is not an overlapping region, the HandleRegion process moves to step 1058, where the longest barrier line in the region to be handled is determined. If there is a tie, one is arbitrarily chosen. In step 1060, this line is checked to see if it extends from one edge of the region to the other. If it does not, the region to be handled is split vertically into two horizontally adjacent sub-regions. This split is done at an arbitrary edge of the longest barrier line. In the preferred embodiment, the left edge is used, and if the left edge of the longest line is the left border of the region, the right edge is used. In table 1d, the barrier under 'A' and 'B' is arbitrarily chosen over the one under 'O' and 'P'. Furthermore, the split occurs on the right edge of this barrier, forming two sub-regions. The first sub-region includes columns 1 and 2, while the second sub-region contains columns 3 and 4. In step 1064, the HandleRegion process is called once for each sub-region, and the returned rules for the sub-regions are combined using a logical 'AND'.

If, in step 1060, the longest barrier line did extend across the entire region, step 1066 simply divides the region into two sub-regions based on the longest line. HandleRegion is then called once for each sub-region, and these regions are combined, in step 1068, using a logical 'OR'. Step 1070 returns whatever rule was created (either step 1064 or 1068), and 1072 ends the HandleRegion process.

As the grammar files (112) are being built, they will also be optimized. During optimization, the grammar rules represented by the tables may be modified to accommodate peculiarities of the chosen speech recognizer (116) and enhance performance. For example, combining multiple rules that begin or end with the same words into a single rule increases efficiency for some recognizers. If two rules begin with the same words (i.e. AB and AC), then the two rules can be combined into a single rule with an additional logical 'OR' (i.e. A(B|C)). Likewise, two rules that end with the same words (i.e. AC and BC), would be combined into a single rule (i.e. (A|B)C).

In step 626, which can occur before or after step 624, the annotated ASR corpus file is generated. In the preferred embodiment, this is initiated with a "generate corpus" in the 'File' menu of the compartment window (203). In the preferred embodiment, individual corpora are first generated and stored in memory for each compartment, and the individual corpora are merged by selecting this option in the tool (202) 'File' menu. When this option is selected, the Annotated Corpus Dialog shown in FIG. 7 appears and the developer selects which corpora will be merged as well as the name of the newly merged corpus. Merging essentially appends the listings of the various corpora into a single listing. The resulting corpus file (122) is stored in memory and will be used by the interpreter (124) during runtime to process utterances that are heard by the speech recognizer (116).

When a compartment corpus is generated, the enumeration traversal described above is performed for the tables within the compartment. In the preferred embodiment, valid utterances within a compartment begin and end in the compartment main table, but the valid utterance "paths" may pass through several tables referenced by non-terminals. Each valid path through the table is written (in text form) to the compartment corpus. Each valid path will also include token data (which serves as a token class identifier) found at the end of the valid path in the compartment's main table (the marked column). As the compartment corpus is generated, the logic of the various valid utterances is also checked to ensure that the resulting grammar makes sense (no null utterances, one token class per valid utterance, etc.).

The resulting corpus (122) is actually a pair of files in the preferred embodiment, and the toolkit (104) generates both of these files when the various compartment corpora are merged into a single corpus. The preferred format for these files is as follows:

corpus file:
    {1}:compl—first utterance in compl, token class 1
    {1-1}: compl—second utterance in compl, token class 1
    {1-2}: compl—third utterance in compl, token class 1
    {2}: compl—first utterance in compl, token class 2
    etc,.

The first number indicates the class of the utterance. The second number, if any, denotes a member of this class. The text that immediately follows, "compl", identifies the compartment. The rest of the line is the actual utterance in text form.

answer file:
    {1}:
    years
    {2}:
    days
    - - -

The first number is the utterance class, and the next line contains the token to be returned. In the example, utterances of class '1' will return the token 'years' to the IVR (130), and utterances of class '2' will return the token 'days'.

After the corpora are merged, the resulting corpus file (122) is ready for use at runtime by the runtime interpreter (124). With the corpus file (122) and grammar files (112) created, the developer has completed development with the grammar development toolkit (104). The toolkit is terminated in step 628 by either selecting the 'Exit' option from the File menu, or by clicking on the 'x' in the upper right-hand corner of the toolkit window.

In light of the above teachings, it is understood that variations are possible without departing from the scope of the invention embodied in these teachings. Any examples provided as part of the inventors' preferred embodiment are presented by way of example only, and are not intended to limit the scope of the invention. Rather, the scope of the invention should be determined using the claims below.

What is claimed is:

1. A method for creating a language grammar for use in an interactive voice response system, comprising the steps of:

opening a main table, said main table comprising rows and columns of cells;
    entering phrase data in said cells;
    marking one of said cells as ending a valid utterance in said language grammar;
    entering token data in a cell associated with said marked cell, where said token data represents the meaning of said valid utterance ended by said marked cell;
    performing an enumeration traversal of said main table a first time to enumerate valid utterances found in said main table;

writing results of said enumeration traversal to a first output file;

analyzing said main table to extract a set of rules which define the valid utterances found in said main table; and writing results of said analysis to a second output file.

2. The method of claim 1, further comprising the step of creating a barrier in said main table that is not to be crossed during said enumeration traversal.

3. The method of claim 1, further comprising the step of identifying a cell as a non-terminal cell, where the contents of said non-terminal cell reference another table.

4. The method of claim 3, further comprising the step of identifying a non-terminal cell as a variable cell, where the contents of said variable cell also reference an algorithm which will be performed when said interactive voice response system detects a variable in a spoken utterance.

5. The method of claim 1, further comprising the step of identifying a cell as an optional cell, where valid utterances that include said optional cell are valid both with and without contents of said optional cell.

6. The method of claim 1, further comprising the step of identifying a cell as an automatic speech recognition (ASR) system directive cell, where the contents of said ASR directive cell have special meaning to an ASR system.

7. The method of claim 1, wherein said step of performing an enumeration traversal comprises the following steps:
   a) beginning with the topmost, leftmost non-blank cell in said main table;
   b) recording contents of said topmost, leftmost non-blank cell in an utterance buffer;
   c) moving to next non-blank cell to the right and appending contents of said cell to said utterance buffer;
   d) repeating step (c) until marked column is reached;
   e) writing contents of said utterance buffer to said first output file;
   f) moving left to the previous non-blank cell whose contents are in said utterance buffer and erasing contents of said previous non-blank cell from utterance buffer;
   g) repeating step (f) until current cell has vertically adjacent non-blank cell below said current cell with no heavy line between said current cell and said vertically adjacent non-blank cell;
   h) moving down to said vertically adjacent non-blank cell and appending contents of said vertically adjacent non-blank cell to said utterance buffer; and
   i) repeating steps (b)–(h) until entire main table has been traversed.

8. The method of claim 7, wherein said step of analyzing further comprises the steps of:
   j) grouping contents of vertically adjacent cells with logical OR; and
   k) combining said grouped contents which are horizontally adjacent with logical AND.

9. A computer system for creating a language grammar, said computer system comprising:
   a main table of columns and rows of cells;
   terminal cells in said main table, where phrase data is entered in said terminal cells and are combined to form valid utterances in said language grammar;
   marked cells in said main table, where marked cells indicate the end of a valid utterance;
   token data in a plurality of said cells, where each said valid utterance is associated with said token data which represents the meaning of said valid utterance;
   means for performing an enumeration traversal of said main table, where said enumeration traversal automatically generates a list of valid utterances in said language grammar; and
   means for analyzing said main table and extracting a set of rules from the contents of said main table, where valid utterances in said language grammar follow said set of rules.

10. The system of claim 9, further comprising one or more barriers in said main table that are not to be crossed during said enumeration traversal.

11. The system of claim 9, further comprising a non-terminal cell, where the contents of said non-terminal cell reference another table.

12. The system of claim 11, further comprising a variable cell, where the contents of said variable cell reference an algorithm which will be performed when said interactive voice response system detects a variable in a spoken utterance.

13. The system of claim 9, further comprising an optional cell, where valid utterances that include said optional cell are valid both with and without contents of said optional cell.

14. The system of claim 9, further comprising an automatic speech recognition (ASR) system directive cell, where the contents of said ASR directive cell have special meaning to an ASR system.

15. A method for creating a language grammar for use in an interactive voice response system, comprising the steps of:
   opening a main table, said main table comprising rows and columns of cells;
   entering phrase data in said cells;
   creating a barrier in said main table that is not to be crossed during an enumeration traversal;
   identifying a cell as a non-terminal cell, where the contents of said non-terminal cell reference another table;
   further identifying a non-terminal cell as a variable cell, where the contents of said variable cell also reference an algorithm which will be performed when said interactive voice response system detects a variable in a spoken utterance;
   identifying a cell as an optional cell, where valid utterances that include said optional cell are valid both with and without contents of said optional cell;
   identifying a cell as an automatic speech recognition (ASR) system directive cell, where the contents of said ASR directive cell have special meaning to an ASR system;
   marking one of said cells as ending a valid utterance in said language grammar;
   entering token data in a cell associated with said marked cell, where said token data represents the meaning of said valid utterance ended by said marked cell;
   performing said enumeration traversal of said main table a first time to enumerate valid utterances found in said main table;
   writing results of said enumeration traversal to a first output file;
   analyzing said main table to extract a set of rules which define the valid utterances found in said main table; and
   writing results of said analysis to a second output file.

16. The method of claim 15, wherein said step of performing an enumeration traversal comprises the following steps:
   a) beginning with the topmost, leftmost non-blank cell in said main table;

b) recording contents of said topmost, leftmost non-blank cell in an utterance buffer;

c) moving to next non-blank cell to the right and appending contents of said cell to said utterance buffer;

d) repeating step (c) until marked column is reached;

e) writing contents of said utterance buffer to said first output file;

f) moving left to the previous non-blank cell whose contents are in said utterance buffer and erasing contents of said previous non-blank cell from utterance buffer;

g) repeating step (f) until current cell has vertically adjacent non-blank cell below said current cell with no heavy line between said current cell and said vertically adjacent non-blank cell;

h) moving down to said vertically adjacent non-blank cell and appending contents of said vertically adjacent non-blank cell to said utterance buffer; and i) repeating steps (b)–(h) until entire main table has been traversed.

17. The method of claim 16, wherein said step of analyzing further comprises the steps of:

j) grouping contents of vertically adjacent cells with logical OR; and k) combining said grouped contents which are horizontally adjacent with logical AND.

* * * * *